(12) United States Patent
Warner

(10) Patent No.: US 7,715,499 B2
(45) Date of Patent: May 11, 2010

(54) FREQUENCY COMPENSATED COMMUNICATIONS RECEPTION

(76) Inventor: Edward Steven Warner, QinetiQ Limited, Malvern Technology Centre, St. Andrews Rd., Malvern, Worcestershire (GB) WR14 3PS ( * ) Notice: Subject to any disclaimer, the term of this patent is extended or adjusted under 35 U.S.C. 154(b) by 825 days.

(21) Appl. No.: 10/589,530

(22) PCT Filed: Feb. 15, 2005

(86) PCT No.: PCT/GB2005/000509

§ 371 (c)(1),
(2), (4) Date: Aug. 16, 2006

(87) PCT Pub. No.: WO2005/081484

PCT Pub. Date: Sep. 1, 2005

(65) Prior Publication Data

US 2007/0165752 A1    Jul. 19, 2007

(30) Foreign Application Priority Data

Feb. 20, 2004    (GB) ................................. 0403762.8

(51) Int. Cl.
*H04L 27/00* (2006.01)
(52) U.S. Cl. ...................... 375/326; 375/230; 375/231; 375/150; 375/344; 375/343; 455/296
(58) Field of Classification Search ................ 375/326, 375/230; 455/296
See application file for complete search history.

(56) References Cited

U.S. PATENT DOCUMENTS 5,247,165 A    9/1993    Hiruta et al.

5,297,165 A *    3/1994    Ueda et al. ................... 375/230

(Continued)

FOREIGN PATENT DOCUMENTS

EP    0 601 855 A3    6/1994

(Continued)

OTHER PUBLICATIONS

International Search Report of PCT/GB2005/000509, mailed Jul. 5, 2005.

(Continued)

*Primary Examiner*—Sudhanshu C Pathak
(74) *Attorney, Agent, or Firm*—Stolowitz Ford Cowger LLP

(57) ABSTRACT

Frequency compensated communications reception includes compensating for frequency offset in a received signal by constructing a reference signal for comparison with a training sequence in a received signal. The reference signal is formed from basis functions and the training sequence. It is obtained by minimising a cost function J constructed from an adaptively weighted combination of basis functions, the training sequence, the received signal and a constraint requiring non-zero signal power. Multi-element antenna signals are weighted with a beamforming weight vector w in J given by formula (I), where X is a matrix of received signal samples, C is a diagonal matrix containing elements of the training sequence, F is a matrix having columns defining basis functions, v is a vector of adaptive weights, index H indicates complex conjugate transpose and $\lambda$ is a Lagrange multiplier constraining beamformer power. A single element antenna signal x is scaled in J given by formula (II), where $\alpha$ is a scaling factor, * indicates a complex conjugate, and x is a vector of received signal samples.

30 Claims, 6 Drawing Sheets

U.S. PATENT DOCUMENTS

| | | | |
|---|---|---|---|
| 6,331,996 | B1 | 12/2001 | Lin et al. |
| 6,393,073 | B1 | 5/2002 | Eilts |
| 6,445,751 | B1* | 9/2002 | Liew .................. 375/326 |
| 2001/0047424 | A1 | 11/2001 | Alastalo et al. |
| 2007/0129042 | A1* | 6/2007 | Kristensson et al. ........ 455/296 |

FOREIGN PATENT DOCUMENTS

WO      02/087110 A1    10/2002

OTHER PUBLICATIONS

GB Search Report of GB0403762.8, dated Jun. 9, 2004.

Dlugos et al., "Acquisition of spread spectrum signals by an adaptive array", The Institution of Electrical Engineers, vol. 37, No. 8, Aug. 1, 1989, pp. 1253-1270, XP002332846.

Li et al., "Pilot-based carrier frequency offset estimation in OFDM systems", Information, Communications and Signal Processing, 2003 and Fourth Pacific Rim Conference on Multimedia, Proceedings of the 2003 Joint Conference of the Fourth International Conference on Singapore, Dec. 15-18, 2003, pp. 874-878, XP010702265.

Kim et al, "Parallel transmission of DS/CDMA signal by orthogonal bases and repeated spreading: the chip-spreading OCDM", Global Telecommunications Conference, 1996, 'Communications: The Key to Global Prosperity London, Nov. 1996, vol. 3, Nov. 18, 1996, pp. 1815-1819, XP010220192.

Brennan et al.; "An adaptive array signal processing algorithm for communications", IEEE Transactions on Aerospace and Electronic Systems, vol. 18, No. 1, Jan. 1, 1982, pp. 124-130, XP001206449.

Dlugos D M et al: "Acquisition of spread spectrum signals by an adaptive array" The Institution of Electrical Engineers, Stevenage, GB, vol. 37, No. 8, Aug. 1, 1989, pp. 1253-1270, XP002332846.

Byoung-Hoon Kim et al: "Parallel transmission of DS/CDMA signal by orthogonal bases and repeated spreading: the chip-spreading OCDM" Global Telecommunications Conference, 1996. Globecom '96. 'Communications: The Key to Global Prosperity London, UK Nov. 18-22, 1996, New York, NY, USA, IEEE, US, vol. 3, Nov. 18, 1996, pp. 1815-1819, XP010220192 ISBN: 0-7803-3336-5.

Cheng Li et al: "Pilot-based carrier frequency offset estimation in OFDM systems" Information, Communications and Signal Processing, 2003 and Fourth Pacific Rim Conference on Multimedia. Proceedings of the 2003 Joint Conference of the Fourth International Conference on Singapore Dec. 15-18, 2003, Piscataway, NJ, USA, IEEE, vol. 2, Dec. 15, 2003, pp. 874-878, XP010702265 ISBN: 0-7803-8185-8.

Su Y. T. and Wu R. C., "Frequency Acquisition and Tracking in High Dynamic Environments", IEEE Trans. Vehic. Technol., vol. 49, No. 6, Nov. 2000, pp. 2419-2429.

Warner E. S. and Proudler 1. K., "Adaptive Multi-Channel Equalization Experiments with HF STANAG 4285 Transmissions in Interference", Proc. IEE Radar, Sonar and Navigation, vol. 150, No. 2, Apr. 2003, pp. 41-49.

Giannetti F., Luise M. and Reggiannini R. "Simple Carrier Frequency Rate-of-Change Estimators", IEEE Trans. Commun., vol. 47, No. 9, Sep. 1999, pp. 1310-1314.

Ghogo M. and Swami A., "Estimation of Frequency Offset and Doppler Rate in Fading Channels", Proc. ICPWC'99, 1999, pp. 105-109.

Morelli M., "Doppler-rate Estimation for Burst Digital Transmission", IEEE Trans Commun., vol. 50, No. 5, May 2002, pp. 707-710.

\* cited by examiner

FREQUENCY COMPENSATED COMMUNICATIONS RECEPTION

This application is the U.S. national phase of international application PCT/GB2005/000509, filed 15 Feb. 2005, which designated the U.S. and claims priority of GB 0403762.8, filed 20 Feb. 2004, the entire contents of each of which are hereby incorporated by reference.

This invention relates to frequency compensated communications reception, and more particularly to a method, an apparatus and a computer program for such reception.

In order to function effectively, any radio communications receiver must first acquire a signal of interest. In practice this can give difficulty associated with conventional superheterodyne techniques: i.e. a transmitter upconverts the frequency of a signal for transmission to radio frequency (RF) by mixing it with a high frequency local oscillator (LO) signal. A receiver downconverts a received signal to baseband by mixing it with an LO signal. However, the transmit and receive LOs may not be accurately at the same frequency and if so will not cancel out exactly, so the baseband signal will have a residual frequency offset which may make it difficult or even impossible for a receiver to acquire the wanted signal. There are also contributions to the frequency offset arising from signal propagation through the atmosphere and relative motion between transmitter and receiver. There may also be interference and noise.

In order to make a communications signal more recognisable, it is known to incorporate a training sequence in it, i.e. a sequence of prearranged data known to the intended receiver: see for example the Standardization Agreement, North Atlantic Treaty Organization, Military Agency for Standardization, "Characteristics of 1200/2400/3600 bits per second single tone modulators/demodulators for HF radio links", 1989. Digital communications signals are transmitted as blocks of data known as "frames", in which the training sequence is in a prearranged position normally at the beginning of the frame. The receiver correlates the training sequence with the received signal, and if a high correlation is reached the training sequence has been located in the received signal. The receiver can then declare that detection has occurred. It is necessary for correlation to be carried out at a frequency sufficiently close to the actual frequency of the received signal such that the magnitude of the correlation is within 1 dB or so of the optimum.

However, the actual frequency offset of a received signal may be unknown, albeit a frequency uncertainty range $\Delta F$ may be known in which the signal may lie. This implies that during signal acquisition a search over the known frequency range is needed. The simplest approach is to use a set of trial frequency offsets in the known frequency range, the frequencies being sufficiently close together that the correlation loss for a received signal frequency between two adjacent trial frequencies is in the region of, or preferably less than, 1 dB. A detection parameter or statistic is calculated for each frequency offset indicating the degree of correlation obtained between the training sequence and the signal with that offset. The offset associated with the maximum degree of correlation is then taken to be the actual signal offset. The problem here is that a large set of trial frequency offsets may be needed, which requires a burdensome degree of computation to calculate detection parameters.

Effects arising from a Doppler frequency offset can compromise signal acquisition. For example, for a civil mobile communications system such as the direct-sequence spread-spectrum (DS-SS) based, third generation, universal mobile telephone system (3G UMTS) with a carrier wave frequency $f_c$ of approximately 2 GHz, the frequency offset is likely to be at least 6.5 kHz due to transmitter/receiver LO mismatch; relative motion will contribute another few hundred Hz. Hence, both mobile handsets and base-stations need to be able to cope with Doppler to achieve signal acquisition. Strictly speaking, the Doppler effect is concerned with frequency shift associated with relative motion only, but in the art of signal acquisition it is used to refer collectively to all contributions to frequency offset. The effect of LO drift must be restricted to less than 1 chip in a DS-SS system otherwise the signal is lost: here 'chip' is a term of art in the field of DS-SS communications. At a transmitter of a DS-SS system data bits of a signal at a rate $R_b$ are multiplied by elements of a spreading code whose values change at a rate $R_c$ where $R_c > R_b$. The elements of the spreading code are called 'chips' and the rate of change $R_c$ is called the chip rate. Another convenient term defined in the art of communications is "normalised Doppler", which is a product $f_dT$ or $f_dT_c$ of Doppler offset $f_d$ and symbol time interval T or chip time interval $T_c$. For example, for acceptable performance, a military HF M-ary phase-shift-keying (MPSK) communications system should have, typically, $|f_dT| < 0.03125$ and civil UMTS should have $|f_dT_c| < 0.0017$. The degree of correlation obtained between a training sequence and a signal with Doppler offset $f_d$ is proportional to $|\sin c(\pi L f_d T)|$ or $|\sin c(\pi L f_d T_c)|$ where L is the number of symbols or chips in the training sequence. This means that, in a correlation based signal acquisition process, it is usually not possible to accommodate both a large Doppler offset and a long training sequence simultaneously.

Signal acquisition may be implemented with a receiver having a single antenna or multiple antenna elements. To perform signal acquisition in the presence of interference and noise with a receiver having multiple antenna elements, it is known to use all of the antenna elements jointly. One method is a least-squares approach as disclosed by Brennan L. E. and Reed I. S., in "An Adaptive Array Signal Processing Algorithm for Communications", IEEE Trans. On Aerospace and Electronic Systems, Vol. AES-18, No. 1, January 1982, pp 124-30. M antenna elements are used to acquire a signal with a training sequence having L symbols each extending over a time interval of duration T. The training sequence is expressed as a (K,1) vector.c, with K>M. The antenna elements have respective output signals all sampled at successive receiver sample time intervals of length $T_s$. These signals are over-sampled to ensure that the majority of samples will not be at a transition between two symbols with consequent uncertainty, and this is expressed by $LT = KT_s$ where L<K. The output signal samples are assembled to provide a (K,M) data matrix X at time $nT_s$. Here n is a time index number that indicates the time associated with the last matrix row in X. The matrix X has M columns each of which contains elements which are digitised output signals from a respective antenna element at sample times $qT_s$ (q=n−K+1 to n). It has K rows each of which contains elements which are digitised output signals from all antenna elements at a respective sample time. A minimum mean-square error $\|e\|^2$ between a weighted version. Xw of the data matrix X and the training sequence vector c, i.e. a least-squares cost function J, is given by:

$$J = \|e\|^2 = \|Xw - c\|^2 \quad (1)$$

Here, w is an (M,1) weight vector with M vector elements which weight outputs of respective antenna elements, and the weighted outputs are summed to combine them before subtracting the training sequence vector.c as indicated in Equation (1). The weight vector w is therefore a beamformer weight because it implements a weighted combination of antenna outputs as is done in forming a beam to or from a phased array of antenna elements. It is known from L. E Brennan and L. S. Reed, "An Adaptive Array Signal Processing Algorithm for Communications", IEEE Transactions Aerospace Electronics Systems, Vol. 18, No. 1, 1982, pp 124-30 that the cost function J is minimised when $w=(X^H X)^{-1} X^H c$, representing the adaptive weight vector for a narrow-band beamformer. Here superscript H indicates a complex conjugate transpose of a vector or matrix. A minimum value of J corresponds to a closest match to c or highest correlation between. Xw and c. Since K>M, the term $X^H X$ is a matrix for which it should be possible to calculate an inverse to form $(X^H X)^{-1}$ and make w obtainable. Having obtained the weight vector w the minimum mean-square error of the cost function J is then:

$$J_{min} = c^H c - c^H X w \quad (2)$$

Since J must be positive it is reasonable to use the term $\gamma_d = c^H X w$ as a detection statistic, and if the training sequence is normalised such that $c^H c = 1$, then $0 \leq \gamma_d \leq 1$. This is disclosed by Dlugos D. and Scholtz R., "Acquisition of Spread-Spectrum Signals by an Array", IEEE Trans. Acoustics, Speech and Signal Processing, Vol. 37, No 8, August 1989, pp 1253-70. The detection statistic is effectively the correlation between the training sequence and the beamformer output from the antenna array. However, this approach gives a low correlation if there is a significant frequency offset as has been said, and then there may be a failure to detect a wanted signal.

It is an object of the invention to provide an alternative signal acquisition technique.

The present invention provides an automated method for frequency compensated communications reception characterised in that it includes compensating for frequency offset in a received signal by adaptively forming a combination of basis functions and a training sequence that collectively approximate to a desired frequency-shifted signal to be acquired.

The invention provides the advantage that the adaptive combination automatically compensates for frequency offset within a range covered by the basis functions without the need to determine offset explicitly.

The method of the invention may include constructing a reference signal or comparison training sequence that is an adaptively formed combination of basis functions and the training sequence. It may be for acquiring a signal with a receiver having multiple antenna elements, and may include constructing the reference signal by minimising a cost function constructed from an adaptively weighted combination of basis functions, a training sequence and a received signal, together with a constraint to obtain non-trivial solutions. The constraint may require non-zero signal power.

The cost function, J, may be given by: $J = \|Xw - CFv\|^2 + \lambda (w^H X^H X w - 1)$, where X is a matrix of received signal samples, w is a vector of beamforming weights which are adaptive to minimise J, C is a diagonal matrix having elements of the training sequence on its diagonal, F is a matrix having columns defining respective basis functions, v is a vector of weights which are adaptive to minimise J, superscript index H indicates a complex conjugate transpose, $\lambda$ is a Lagrange multiplier and the term which incorporates $\lambda$ is to constrain beamformer output power to be non-zero. The adaptive weight vectors w and v may be determined at intervals from true estimates of a correlation matrix determined from multiple data vectors and from inverses of such estimates recursively updated to reflect successive new data vectors which are rows of the matrix X. The inverse correlation matrices may be recursively updated by:

a) forming a vector u(n) having a first element $u_1(n)$ equal to $\sqrt{U_{1,1}(n)}$ and other elements $u_p(n)$ (p=2 to M) which are respective ratios $U_{p,1}(n)/u_1(n)$, $U_{p,1}(n)$ is a $p^{th}$ element of a first column of a matrix U(n), the matrix U(n) is given by $U(n) \equiv u(n)u^H(n) = x(n)x^H(n) - x(n-K+1)x^H(n-K+1)$, x(n) is a most recent data vector and x(n-K+1) is a least recent data vector involved in updating in each case, and $x(n)x^H(n)$ and $x(n-K+1)x^H(n-K+1)$ are correlation matrices;

b) premultiplying a previous inverse correlation matrix P(n-1) by vector $u^H(n)$ and postmultiplied by vector u(n) to form a product and adding the product to a forget factor to form a sum;

c) postmultiplying the previous inverse correlation matrix P(n-1) by vector u(n) and dividing by the said sum to form a quotient; and d) subtracting the quotient from the previous inverse correlation matrix P(n-1) to provide a difference.

The method may include acquiring a signal with a receiver having a single antenna element and constructing the reference signal by minimising a cost function constructed from an adaptively weighted combination of basis functions, a training sequence, a scaled received signal and a constraint requiring non-zero signal power. The cost function, J, may be given by: $J = \|x - CFv\|^2$ where x is a vector of received signal samples, and v, C and F are as defined earlier. The cost function, J, may alternatively be given by: $J = \|\alpha x - Gv\|^2 + \lambda (\alpha^* x^H x \alpha - 1)$ where $\alpha$ is a scaling factor, x is a vector of received signal samples, G is a matrix equal to CF and v, $\lambda$, C, F and H are as defined earlier.

In another aspect, the present invention provides apparatus for frequency compensated communications reception characterised in that it includes means for compensating for frequency offset in a received signal by adaptively forming a combination of basis functions and a training sequence that collectively approximate to a desired frequency-shifted signal to be acquired.

In a further aspect, the present invention provides computer software for controlling a computer processor and for use in frequency compensated communications reception characterised in that it includes program code instructions for compensating for frequency offset in a received signal by adaptively forming a combination of basis functions and a training sequence that collectively approximate to a desired frequency-shifted signal to be acquired.

The apparatus and software aspects of the invention may have preferred features equivalent mutatis mutandis to those of the method aspect.

In order that the invention might be more fully understood, embodiments thereof will now be described, by way of example only, with reference to the accompanying drawings, in which FIGS. 1 to 10 relate to reception with multiple antenna elements, FIGS. 11 to 19 to single antenna reception, and:

FIG. 1 provides graphs of signal-to-interference-and-noise-ratio (SINR) against normalised frequency for comparison of the invention with other techniques;

Figure 8:
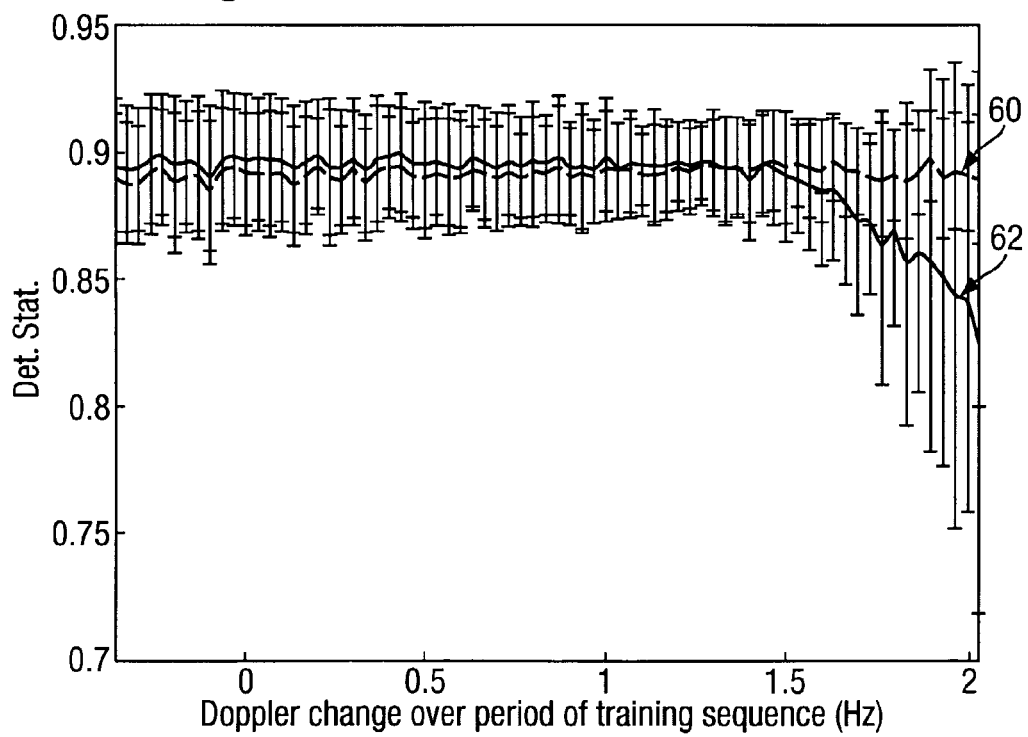
Figure 9:
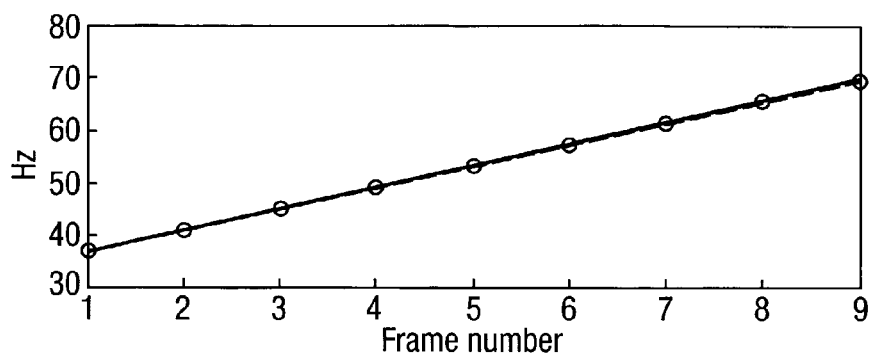
Figure 10:
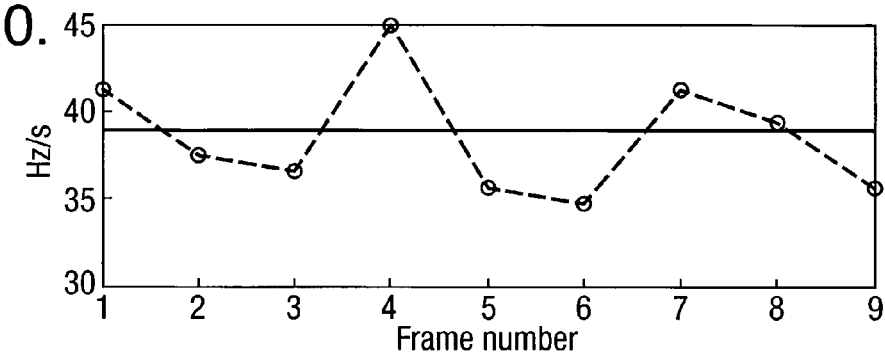
Figure 11:
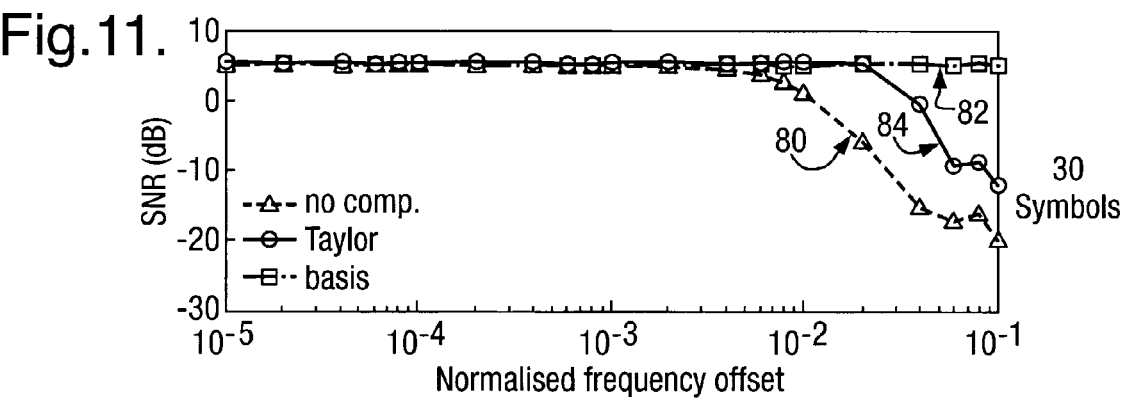
Figure 12:
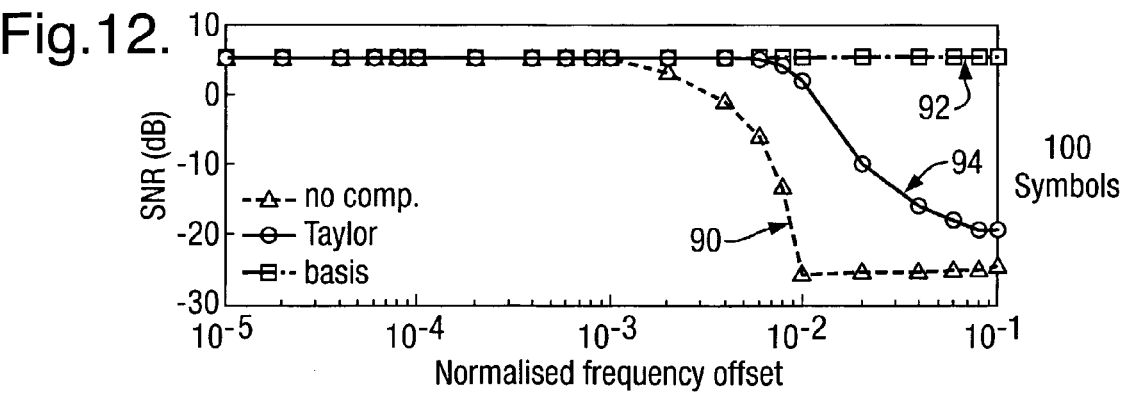
Figure 13:
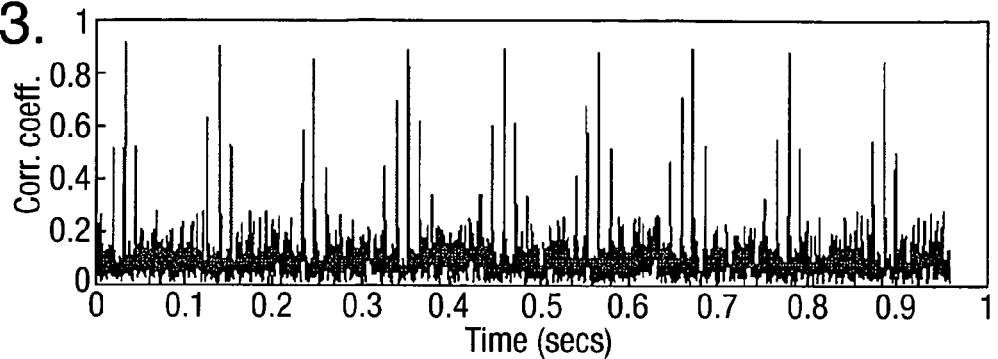
Figure 14:
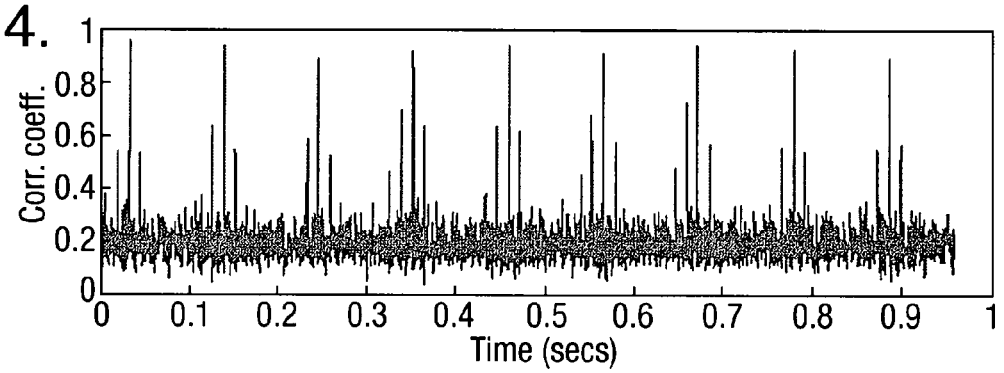
Figure 15:
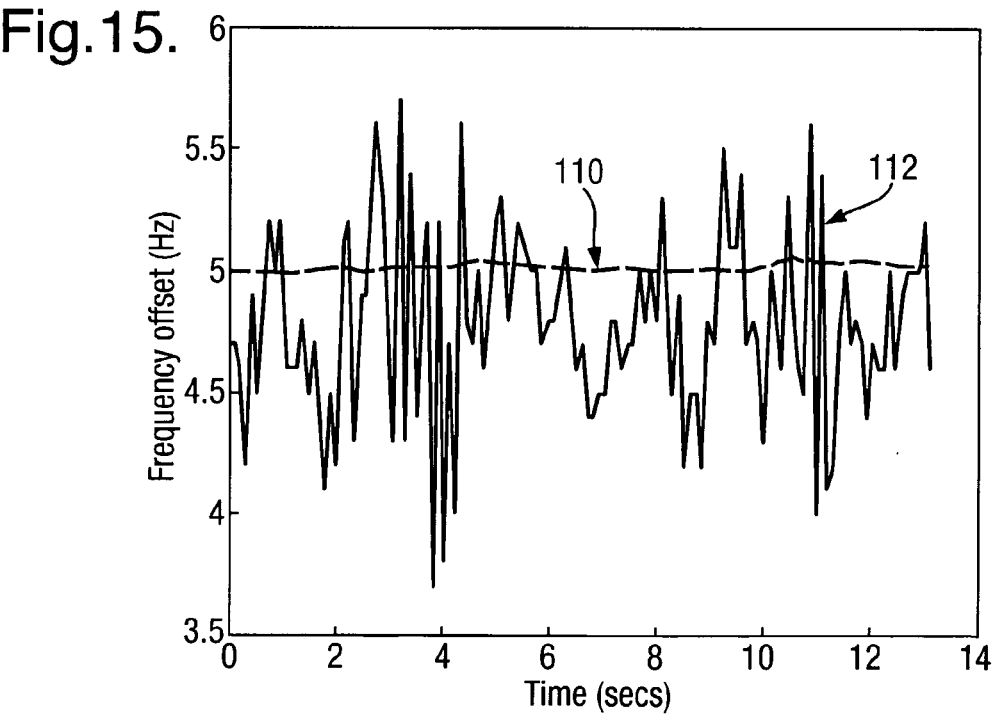
Figure 16:
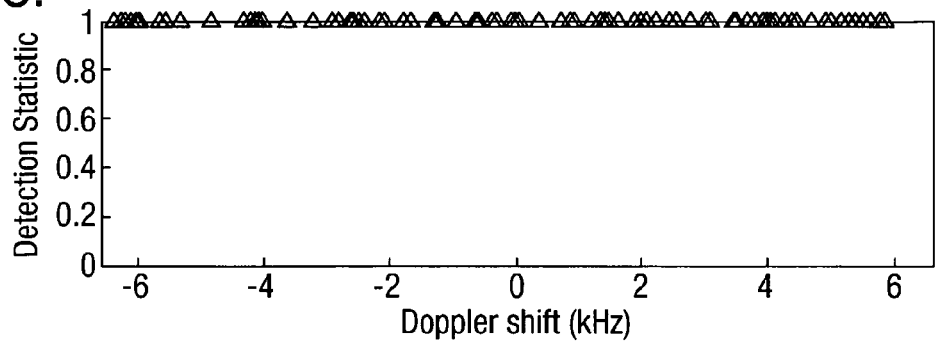
Figure 17:
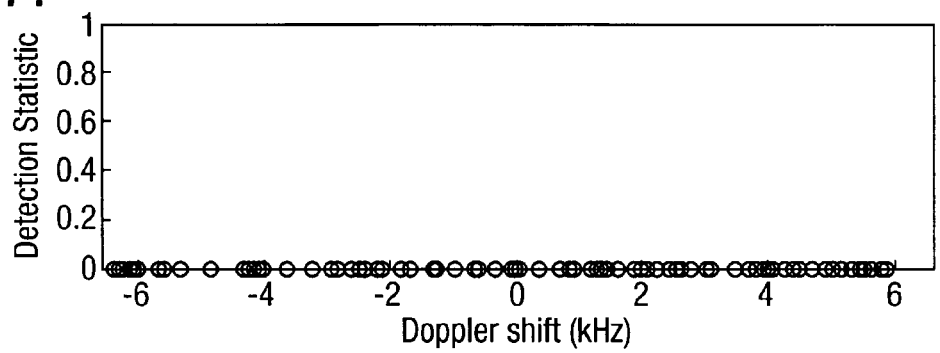
Figure 18:
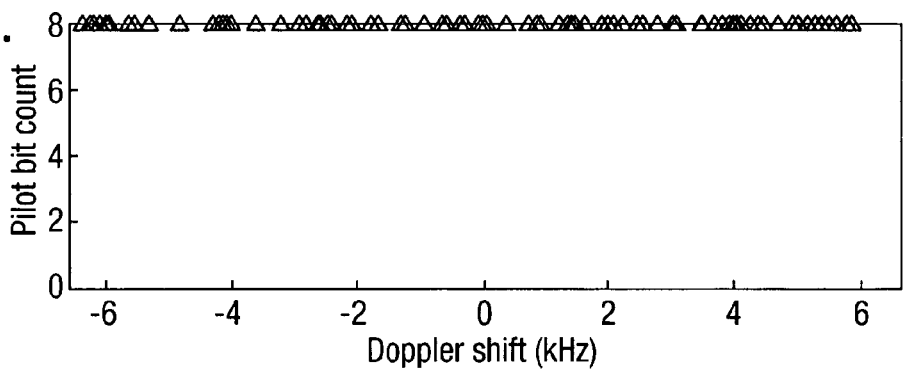
Figure 19:
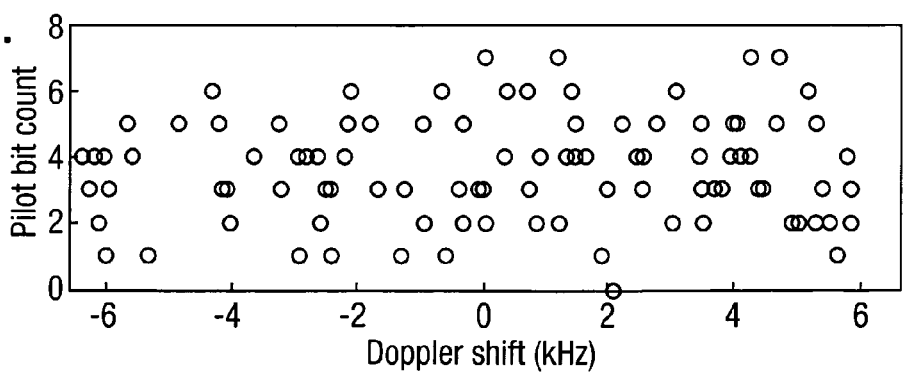

FIG. 8 provides curves of detection statistics plotted against Doppler change in frequency over a training period;

FIG. 9 shows true and estimated Doppler shift over a training sequence;

FIG. 10 shows true and estimated Doppler rate over a training sequence;

FIGS. 11 and 12 provide plots of signal-to-noise-ratio (SNR) for different processing techniques against normalised Doppler for 30 and 100 symbols respectively;

FIG. 13 shows a correlation coefficient for a received signal correlated with a training sequence for a zero Doppler bin;

FIG. 14 shows a correlation coefficient for a received signal correlated with a training sequence using the method of the invention;

FIG. 15 provides true and estimated frequency offsets estimates over a segment of off-air data plotted against time, the former obtained after timing offset recovery, fine frequency compensation and filtering and the latter by the method of the invention;

FIGS. 16 and 17 are plots of detection statistic against Doppler shift for a UMTS example with and without the adaptive frequency compensation method of the invention respectively, and indicate detection performance for an emitter over a pilot bit sequence; and FIGS. 18 and 19 show pilot bit counts from which the results shown in FIGS. 16 and 17 were derived, i.e. with and without the adaptive frequency compensation method of the invention respectively.

In accordance with the invention, it has been discovered that it is possible to acquire a signal by compensating for frequency offset of a received signal adaptively, i.e. in a self configuring manner. A reference signal/training sequence is constructed that is an approximation to a reference signal/training sequence in a received signal. This is achieved by multiplication of an original reference signal/training sequence by an adaptive combination of an appropriately selected set of basis functions that span a subspace in which the cisoid (complex sinusoid) associated with the frequency offset lies. The basis functions may for example be complex sinusoids (cisoids), real sinusoids, functions derived from a singular value decomposition (SVD) of a set of cisoids or sinusoids spanning a Doppler offset range, Legendre polynomials or prolate spheroids. All of these have been used and found to be effective. To judge whether or not a constructed reference signal/training sequence (a product of the original training sequence and a weighted combination of basis functions) is an acceptable approximation to a reference signal/training sequence in a received signal, the degree of correlation between the two is determined using a cost function in this example. A minimum in the cost function indicates a maximum correlation and a most appropriately weighted combination of basis functions. In the case of a receiver with multiple antenna elements, an appropriate multi-channel least-squares (MC-LSQ) cost function J is given by:

$$J = \|Xw - CFv\|^2 + \lambda(w^H X^H Xw - 1) \quad (3)$$

where X and w are as defined earlier; values in a training sequence c (without frequency shift) are respective matrix elements on the diagonal of C, which is a (K,K) diagonal matrix (i.e. all off-diagonal matrix elements are zero); v is a vector of adaptive weights, and F is a matrix in which each column has matrix elements defining a respective sinusoidal basis function in this example, although other functions may be used as indicated earlier. The product Fv provides a weighted combination of the basis functions in F. The parameter $\lambda$ is a Lagrange multiplier and the term of which it is a part constrains beamformer output power to be non-zero, in order to obtain non-trivial solutions for w and v. Other constraints may also be used. Constraining the beamformer output power is a simple scaling operation which has no impact on signal acquisition. As described by S. Haykin, Adaptive Filter Theory, $2^{nd}$ ed. Pub. Prentice-Hall, Englewood Cliffs, N.J., 1991, J has conjugate derivatives with respect to v and w denoted by $\nabla J_{v^*}$ and $\nabla J_{w^*}$ respectively. Here * indicates a complex conjugate. J is a minimum where both derivatives $\nabla J_{v^*}$ and $\nabla J_{w^*}$ are zero. Setting $\nabla J_{v^*}$ to zero and writing CF=G (which can be pre-computed and stored as C and F are predefined) gives:

$$v = (G^H G)^{-1} G^H Xw \quad (4)$$

Similarly, setting $\nabla J_{w^*}$ to zero gives:

$$w = \left(\frac{1}{1+\lambda}\right)(X^H X)^{-1} X^H Gv \quad (5)$$

Substituting for v in Equation (5)

$$w = \left(\frac{1}{1+\lambda}\right)(X^H X)^{-1} X^H G(G^H G)^{-1} G^H Xw = \left(\frac{1}{1+\lambda}\right) Aw \quad (6)$$

Equation (6) is an eigenvalue equation, solution of which gives the weight vector w. To minimise the cost function conditioned on a fixed w, w is taken as a principal eigenvector associated with a maximum eigenvalue of A (this corresponds to scaling and does not affect results because w is a beamformer weight). The vector v can then be found by substituting for w in Equation (4).

A detection statistic is now defined to provide a measure of the degree of success of signal acquisition. There is a variety of possible detection statistics. In this example the chosen detection statistic is $\gamma_d = (v^H G^H Gv)/(w^H X^H Xw)$, which is effectively the ratio of the power in the training sequence (modified by weighted sinusoids) to the beamformer output power. Alternatively, a correlation coefficient between $\hat{c} = Xw$ and c could be used, and is available from standard signal processing texts. Another alternative for a detection statistic is $\gamma = w^H X^H G(G^H G)^{-1} G^H Xw$, since this term must be maximised to minimise the mean-square error conditioned on fixed w.

The frequency compensation method of the invention synthesises a version of the training sequence which matches the frequency offset equivalent in the received signal. This allows the signal to be acquired/detected, but it leaves unaffected the received signal frequency offset, i.e. that between the received signal and the receiver LO together with any contribution from signal propagation effects. Consequently, this frequency offset remains to be removed from the array output before the data in the signal can be obtained. This can be achieved in several ways. For example, having adapted the weight vector w, v is available: so Fv=g can be calculated and will resemble a cisoid. A correlation of the complex conjugate transpose $g^H$ of g with cisoid frequencies f that span the frequency uncertainty region is therefore performed to determine which frequency $f_{opt}$ is a best match to the frequency offset between the received signal and the receiver LO; i.e. a frequency $f_{opt}$ and associated cisoid $s(f_{opt})$ are found which maximise a correlation expression $|g^H s(f)|^2$.

Consider the term CFv=Cg: C and F are predefined (see above). C is a diagonal matrix, so Cg=Gc where G is a diagonal matrix whose diagonal elements are elements of g, which itself is a weighted version of the basis functions. A diagonal matrix S is now constructed with diagonal elements which are the elements of $s(f_{opt})$, i.e. $S=\text{diag}(s(f_{opt}))$ is formed. A product S*Gc is then formed: now S*Gc≅c because S*G≅I (I=identity matrix) and because $s(f_{opt})$ maximises $|g^H s(f)|^2$. This recovers the training sequence c with no frequency offset.

$s*(f_{opt})$ is the cisoid required to remove the frequency offset from the beamformer output Xw over the training sequence portion of a data frame: this cisoid is now extended to cover the full duration of the data frame, which gives $e^{-j\Phi}(\text{diag}(s*(f_{opt})))Xw$ as a recovered signal from which frequency offset has been removed at least in large part. A phase correction may be needed because $g^H s(f_{opt})=e^{j\Phi}$ can be complex. This assumes that data is acquired in successive frames and that the beamformer weights and frequency offset do not change significantly over a data frame. There are also well-known standard techniques for removing any residual frequency offset.

Another approach for determining the frequency offset is to search for the vector $s(f)=[1, e^{j2\pi fkT_s}, \ldots, e^{j2\pi f(K-1)T_s}]^T$ that produces a maximum expressed as $\max_f[\text{Re}(s^T(f)CXw)]$. Here, the superscript T denotes vector transpose. As before, Xw is the beamformer output over the training sequence portion of the data frame and C is a diagonal matrix with training sequence elements as defined previously. The approach is to maximise the correlation between Xw and $s^T(f)C$ (i.e. a frequency-shifted version of the training sequence). For given w, CXw is fixed and need only be calculated once. As before, a phase correction may also be needed because $s^T(f_{opt})CXw=e^{j\Phi}$ and can be complex. The recovered signal is $e^{-j\Phi}(\text{diag}(s*(f_{opt})))Xw$.

To reduce the computational burden, frequency searching can be divided into regions with decreasing step size, e.g. a bisection search can be performed in steps of say 10, 5, 1, 0.1 Hz; a frequency offset is first localised to one 10 Hz interval, then it is localised to one of two 5 Hz intervals and so on until it is localised to one 0.1 Hz interval.

The frequency offset may also be estimated as follows: as previously indicated, Fv=g which resembles a cisoid i.e. $g=e^{j\beta}[1, \ldots e^{j2\pi\Delta fkT_s}, \ldots e^{j2\pi\Delta f(K-1)T_s}]^T$, where β is a phase factor, and as before, k is an index (k=0 to K−1) and Δf is the nominal frequency offset. The $k^{th}$ element in g, i.e. $g_k$ is given by $g_k=e^{j2\pi\Delta fkT_s}$ and $$\Delta f = (2\pi T_s m)^{-1} \arg\left(\sum_k g^*_{k-m} g_k\right),$$

where m is a positive integer (usually equal to 1). The frequency offset can also be estimated in other ways (i.e. conventional single-channel methods) based on optimum T-spaced samples. In this connection see e.g. Meyr H. Moeneclaey M. and Fechtel S. A., Digital Communications Receivers, pub. John Wiley and Sons, New York, 1988, and Su Y. T. and Wu R. C., "Frequency Acquisition and Tracking in High Dynamic Environments", IEEE Trans. Vehic. Technol., Vol. 49, No. 6, November 2000, pp 2419-29.

However, at low signal-to-interference-and-noise-ratio (SINR) and for short training sequences, accurate frequency estimation is likely to be difficult to achieve irrespective of the estimation technique. In any event, a Doppler shift estimated from the training data can be applied to the data segment of the data frame (assumed to consist of a training sequence followed by a data block).

Ideally, for the basis function combining approach, the objective is to find a matrix F consisting of a suitable set of functions that allows synthesis of a cisoid that lies within a given range of frequencies. Rather than trying to cover a large range of frequency offset, although possible, the frequency range may be divided into, say, a number of sub-ranges. A suitable set of functions spanning a given range of frequencies is obtained as follows. It is firstly assumed that the required frequency offset does not exceed a maximum value that is known in advance. A matrix A is then formed with columns which are respective complex sinusoids (i.e. cisoids) in other words elements in each of its columns are values defining these cisoids. A singular value decomposition (SVD) of the matrix A is given by $A=U\Sigma V^H$ where U is a matrix containing eigenvectors of $AA^H$, V is a matrix containing eigenvectors of $A^H A$, H is as defined earlier and Σ denotes a diagonal matrix having singular values (square roots of eigenvalues) on its diagonal. This SVD is now computed as described in the Haykin reference previously given. Since the matrix A is composed of cisoids some of which will be correlated with one another, it is likely to be rank deficient, i.e. to have a rank r (denoting the number of its linearly independent columns) which is less than the number of columns of A. The rank r can be found via information theoretic techniques in the Haykin reference or by thresholding singular values resulting from the SVD of the matrix A. An appropriate set of basis functions for synthesising a received signal frequency offset is taken as F=U(1:K,1:r) where K is the length of the training sequence, i.e. the number of sample values in it. The basis function set is optimised in the sense that it should minimise mean-square-error in re-construction of a cisoid.

To reduce the amount of computation in the adaptive frequency compensation method of the invention, instead of using a matrix A of cisoids or complex exponentials, it has been confirmed by simulation that cosines or sines (i.e. real sinusoids) will also suffice as well as the other real functions mentioned earlier.

The initial detection or acquisition search may be modified to cover a range of time delays. There are two reasons why time delays are relevant: the training sequence in a block of received data has a starting point which is initially unknown, so the acquisition search may be speeded up searching in parallel for the starting point, i.e. at a number of different delays simultaneously. Alternatively, it might be useful to combine multipath signals, these being signals which are relatively delayed versions of one another. A cost function J for this approach can be written as:

$$J = \|Xw - C_1 F v_1 - C_2 F v_2 - \ldots\|^2 + \lambda(w^H X^H X w - 1) \quad (7)$$

$$= \left\|Xw - [C_1 F \; C_2 F \; \ldots \;]\begin{bmatrix}v_1\\v_2\\\vdots\end{bmatrix}\right\|^2 + \lambda(w^H X^H X w - 1)$$

$$= \|Xw - \hat{G}\hat{v}\|^2 + \lambda(w^H X^H X w - 1)$$

where $\hat{G}$ is a matrix of matrices $C_1 F$ etc., and $\hat{v}$ is a vector of vectors $V_1$ etc. Each matrix $C_n$ (n=1,2,...) is diagonal and has all or part of the training sequence along its main diagonal with a delay (or time-shift) of (n−1) samples i.e. the $n^{th}$ matrix $C_n$ has n−1 zeroes on the upper part of its diagonal, the rest of which is occupied by at least the initial part of the training sequence. Solutions of Equation (7) for the weight vectors w and $\hat{v}$ can be found as indicated earlier.

Adaptive frequency compensation in accordance with the invention was tested by simulation. A received signal was simulated as an HF Standard NATO Agreement 4285 signal with signal to noise ratio 3 dB: this signal was incident on an antenna array with six antenna elements arranged with centres in a straight line spaced by half-wavelength intervals. The signal had a channel symbol rate of 2.4 kilosymbols/s. This signal was based on a periodic data frame structure of 256 symbols the first 80 of which form a known training sequence published in the Standardization Agreement, North Atlantic Treaty Organization, Military Agency for Standardization, "Characteristics of 1200/2400/3600 bits per second single tone modulators/demodulators for HF radio links", 1989 (referred to as "STANAG"). The angle of incidence of the signal on the antenna array was 30° from the normal to the antenna array. A barrage noise jammer with jammer to noise ratio 30 dB incident from 50° from the normal to the antenna array was also simulated. The Doppler frequency offset $\Delta f_d$ was varied from −75 Hz to +75 Hz in steps of 2 Hz, giving a maximum normalised Doppler of approximately 0.03 (high enough to give signal acquisition difficulty.

Figure 1:
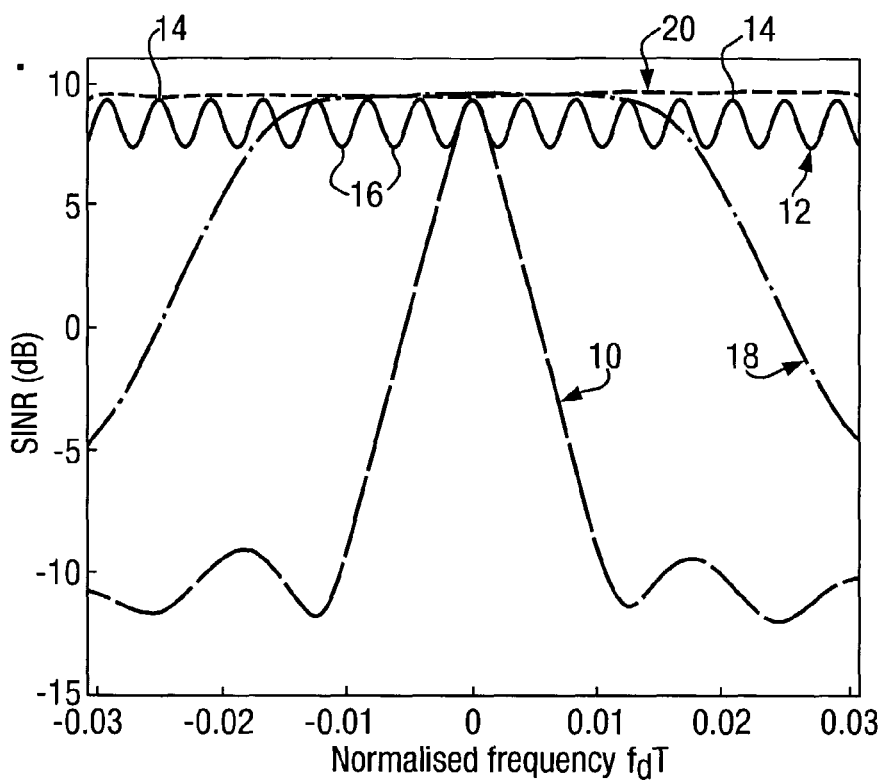

FIG. 1 shows the antenna array output signal-to-interference-plus-noise-ratio (SINR) as a function of normalised Doppler frequency $|f_dT| \leq 0.03$ for various multi-channel least-squares (MC-LSQ) detection methods. A first curve 10 shows SINR variation with normalised frequency when there is no frequency compensation of any kind. As expected, detection/acquisition performance is acceptable at zero normalised Doppler frequency, but degrades significantly as the normalised Doppler frequency increases, worsening by about 20 dB as the normalised frequency passes 0.01.

A second curve 12 shows SINR versus normalised Doppler frequency for the case where a conventional frequency search was used with a frequency bin width of 10 Hz and 15 bins in total. This curve has peaks (e.g. at 14) at regular intervals of normalised Doppler frequency and corresponding multiples of 10 Hz; here detection is optimum, but between the peaks 14 detection degrades by over 2 dB at minima such as 16.

A third curve 18 shows SINR versus normalised Doppler frequency for an MC-LSQ with frequency compensation based on a Taylor expansion of a cisoid to populate the matrix F in the method of the invention. A cisoid is given by $e^{j\theta} = \cos\theta + j\sin\theta$, and consequently Taylor expansions of $\cos\theta$ and $\sin\theta$ can be used instead of these sinusoids to form a cost function J. The curve 18 shows that detection performance can be maintained over a central region of normalised frequency from about −0.015 to +0.015 for which the Taylor expansion is valid.

A last curve 20 shows SINR versus normalised Doppler frequency for an MC-LSQ used with adaptive basis function combining in accordance with the invention. A basis function set was used which consisted of seven basis functions, as necessary to cover a maximum frequency offset of 75 Hz. The curve 20 shows that detection performance is maintained across the entire range of normalised frequency. Moreover, it can be shown that it involved a computation load which was roughly half that associated with curve 12.

The basis function set was derived as described earlier by SVD of a matrix A with columns which were complex (other functions may also be used as indicated earlier).

The rank r of the matrix A was found by thresholding singular values resulting from its SVD. The basis function set was designated F=U(1:K,1:r) as previously mentioned.

Figure 2:
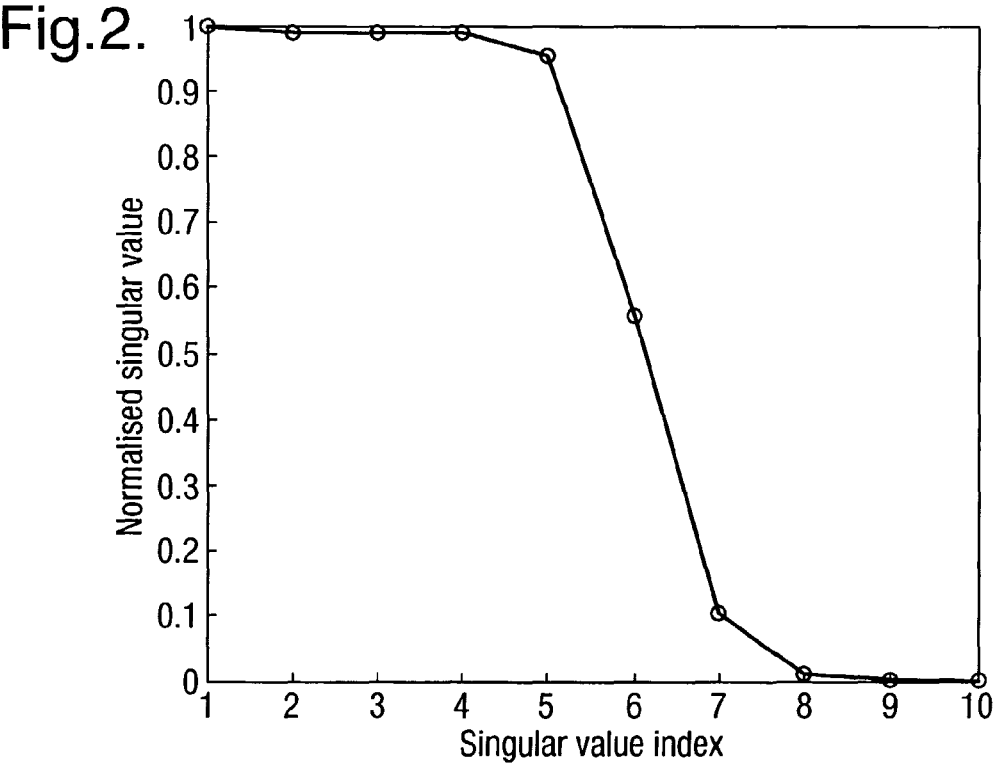
FIG. 2 shows normalised singular values associated with a basis function set.

Referring now to FIG. 2, singular value normalised by division by a maximum singular value is plotted against index number for the ten highest magnitude singular values with indices 1 to 10. Singular values 1 to 7 have large or significant values. Singular values 8 to 10 are insignificant; they are regarded as being below threshold and the functions with which they were associated were not considered further.

Figure 3:
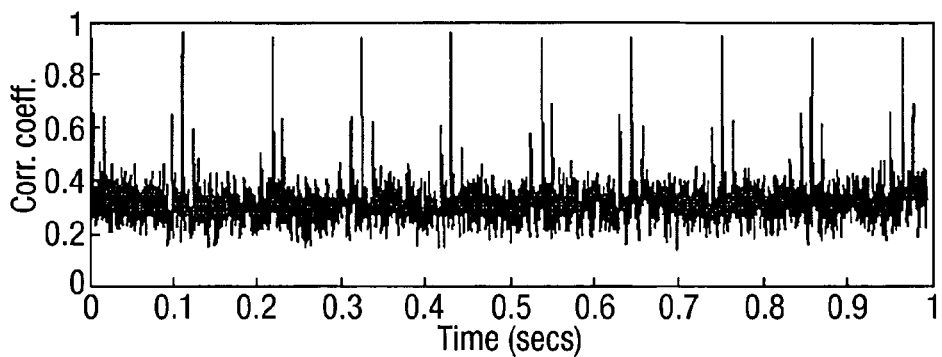
FIG. 3 illustrates correlation coefficient plotted against time for a Doppler offset received signal correlated with a training sequence with no frequency shift compensation.
Figure 4:
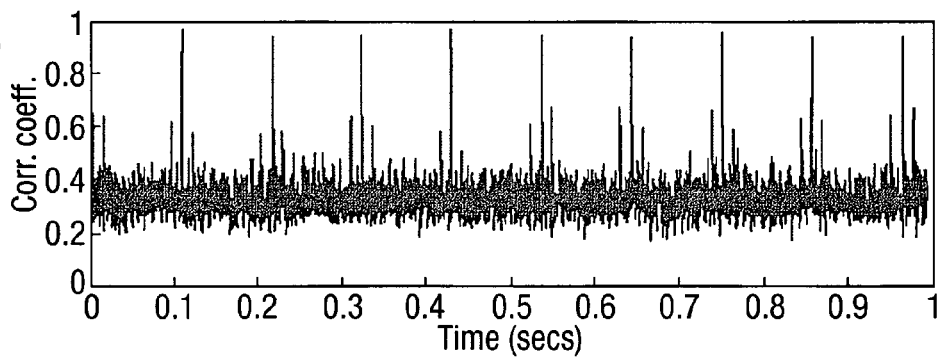
FIG. 4 is equivalent to FIG. 3 except that frequency shift compensation is implemented in accordance with the invention.
Figure 5:
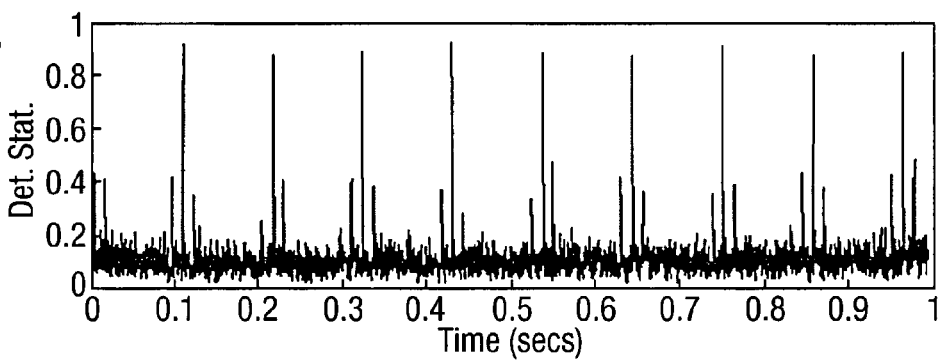
FIG. 5 shows a detection statistic plotted against time for a received signal processed as for FIG. 3 with no frequency shift compensation.
Figure 6:
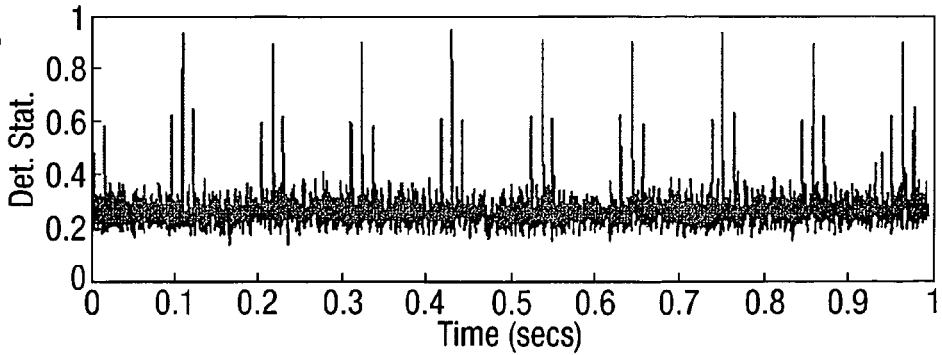
FIG. 6 is equivalent to FIG. 5 except that frequency shift compensation is implemented in accordance with the invention.

To test the efficacy of the adaptive frequency compensation method of the invention, it was incorporated into a software implementation of a multi-channel HF STANAG 4285 modem and run with off-air data. The data contained an HF STANAG 4285 signal and strong interference with the same bandwidth as the STANAG signal. The input SINR at an antenna was typically −10 dB and an antenna array with eight antennas was used. Results obtained are shown in FIG. 3 to 6. FIG. 3 shows correlation coefficient plotted against time for a received signal comprising a short segment of off-air data correlated with a training sequence with no frequency shift compensation; the Doppler offset is approximately 2 Hz. FIG. 4 is equivalent to FIG. 3 except that it was obtained from data processed using an adaptive basis function set with seven basis functions for frequency shift compensation in accordance with the invention. FIG. 5 shows a detection statistic plotted against time for a short segment of off-air data processed as for FIG. 3. FIG. 6 is equivalent to FIG. 5 except that it was obtained from data processed using the adaptive basis function set in accordance with the invention. The detection statistic is a parameter that lies between 0 and 1; it is used to indicate whether or not a signal has been successfully detected. A minimum threshold for detection to be said to occur was set as 0.4. FIGS. 3 to 6 show that this embodiment of the invention works satisfactorily with the STANAG signal being detected.

Figure 7:
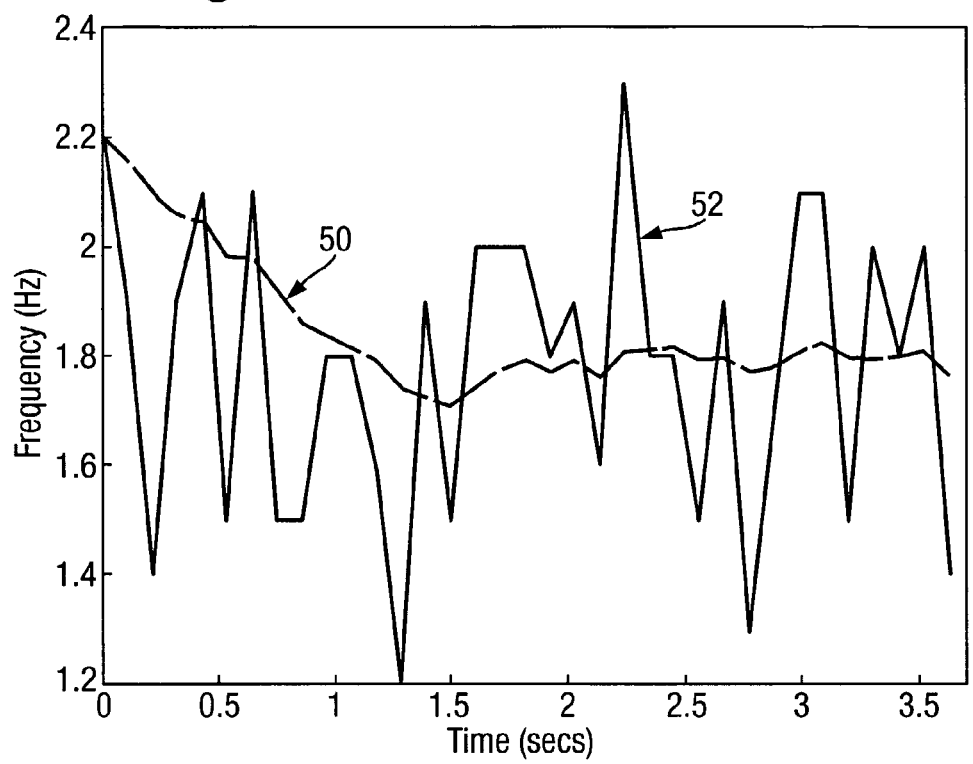
FIG. 7 shows evolution of frequency estimates as a function of time.

FIG. 7 shows evolution of frequency estimates as a function of time over a longer segment of off-air data compared to that used for FIGS. 3 to 6. A first curve 50 shows the frequency as tracked by the software modem implementation referred to above, i.e. after timing offset recovery, fine frequency compensation and filtering. A second curve 52 curve shows initial frequency estimates on acquisition returned by this embodiment of the invention. These estimates would seem to be in excellent agreement with the true frequency. In this case, frequency estimation was performed in maximum likelihood fashion by correlating the adaptively weighted basis function with sinusoids. This may not be the best option since the signal formed from adaptively weighted basis functions is not necessarily a clean sinusoid. However, as the results indicate, it is reasonable.

Computational requirements were assessed for computing a detection parameter by the conventional multi-channel least squares ("MC-LSQ") with a frequency bin search and by the adaptive frequency compensation ("AFC") technique of the invention. An antenna array is treated as having M antenna elements, the training sequence has K samples as before and there are F potential frequency offsets for the signal to be acquired. In the examples of the invention, P is the number of basis functions (real functions in this example). It is assumed that detection statistics are calculated at the sampling rate, i.e. at $1/T_s$ where $T_s$ is a time interval between successive signal samples. Table 1 shows the computational requirements for the conventional MC-LSQ method with a frequency search. To estimate the required number of operations, one complex multiplication is taken to consist of four real multiplications and two real additions, i.e. 6 real operations in total.

TABLE 1

| Technique | Number of real operations |
| --- | --- |
| Conventional MC-LSQ | $(4KM(M + 1) + 8M^3) + F(8KM + 8M^2 + 8M)$ |
| AFC to form w | $N = (4KM(M + 1) + 8M^3) + 4M$ $(KP + P^2 + 4MP + 2M^2)$ |
| AFC to form detection statistic | $N + 8(PM + P + PK + K + MK + M) + 12$ |

In terms of computational complexity, the AFC method of the invention is less demanding than conventional MC-LSQ. In the example discussed by Warner E. S. and Proudler I. K., "Adaptive Multi-Channel Equalisation Experiments with HF STANAG 4285 Transmissions in Interference", Proc. IEE Radar, Sonar and Navigation, Vol 150, No 2, April 2003, pp 41-49, M=5, L=208, P=7 and F=15: with these parameters, AFC takes 62623 operations and conventional MC-LSQ takes 154360 operations. So, the AFC method is computationally far less demanding (by a factor of approaching 2.5 here) and so probably more appropriate for practical implementation in many situations.

The complexity of the AFC method may be further reduced. As has been said in connection with e.g. Equations (1) and (3), minimisation of the cost function J requires the inverse correlation matrix $(X^H X)^{-1}$ of a correlation matrix $X^H X$ where X is a data matrix. As an alternative to forming and inverting a correlation matrix $X^H X$ explicitly at each sample time (i.e. each time a new row or sample vector is appended to the data matrix X and an oldest row deleted), a recursive approach may be adopted. If data is acquired and processed on a sample by sample basis, an M by M correlation matrix R(n) at an nth sample time can be written as a sum of outer products of the form $x(k)x^H(k)$ using K most recent sample data vectors $x(n-K+1)$ to $x(n)$ in the data matrix X, i.e.

$$R(n) = \sum_{k=n-K+1}^{n} x(k)x^H(k) \qquad (9)$$

In a receiver, a received signal which has been acquired may be stored in a data buffer prior to processing. For convenience, it is now assumed that the data buffer is full at sample time n=K (in units of a constant time interval $T_s$ between adjacent samples). Now as time progresses from n=K+1 to 2K, an estimate of the true correlation matrix at time n=2K can be accumulated while the inverse of the correlation matrix after incorporation of each most recent sample and deletion of the oldest is computed recursively for each successive data vector x (see below); the inverse correlation matrix is obtained initially be inverting the true correlation matrix formed at time n=K, this inverse is used at time n=K and then updated recursively at times n=K+1 to 2K−1. At time n=2K, the inverse correlation matrix previously derived recursively using sample vector x(2K−1) is discarded and a new estimate of the true correlation matrix is calculated from accumulated data and used to re-initialise the inverse of the correlation matrix for further recursive computations for sample times 2K+1 to 3K−1. So, true correlation estimates are formed at times mK where m is an integer and used to initialise the recursive computation for times mK+1 to (m+1) K−1. Recursive computations generally tend to build up numerical errors, but in this case the problem is circumvented by the periodic re-initialisation of the inverse of the correlation matrix. Numerical error should therefore be insignificant and have little or no effect on ensuing calculations, and this has been verified. For illustrative purposes the number of samples between re-initialisations of the inverse of the correlation matrix has been given as the length of the training sequence K although this is not strictly necessary.

Given a true estimate of the correlation matrix at times mK as aforesaid, a correlation matrix $X^H X$ of a sample vector outer products $x(k)x^H(k)$ can be inverted. While the next true correlation matrix estimate is being formed, an inverse correlation matrix can be formed recursively via a recursive least squares (RLS) approach, as in the Haykin reference previously given. Table 2 outlines steps involved in recursively generating an nth inverse correlation matrix P(n) (where $P(n) = R_n^{-1}$) from an (n−1)th inverse correlation matrix P(n−1) where u(n) is an nth (M,1) vector such that:

$$u(n)u^H(n) = x(n)x^H(n) - x(n-K+1)x^H(n-K+1) \equiv U(n) \qquad (10)$$

where x(n) is a most recent vector of data samples and x(n−K+1) is a least recent vector of data samples of those considered for P(n), and $x(n)x^H(n)$ and $x(n-K+1)x^H(n-K+1)$ are (M,M) correlation matrices which are subtracted from one another to form U(n). Equation (10) represents a particularly advantageous method for obtaining the (M,1) vector u(n); this vector is found as follows. Denoting $U_{p,1}(n)$ as the pth element of the first column of U(n), the first element $u_1(n)$ of u(n) is $\sqrt{U_{1,1}(n)}$ and the other elements $u_p(n)$ (p=2 to M) of u(n) are each equal to a respective ratio $U_{p,1}/u_1(n)$. In the table below appear the numbers of arithmetic operations required to carry out the various steps of calculating P(n). In this connection, the square root of a real number is assumed to take Q operations and finding the reciprocal of this number is also assumed to take Q operations. The exact value of Q will depend on architecture, arithmetic precision etc. To estimate the required number of operations, one complex multiplication is taken to consist of four real multiplications and two real additions, i.e. 6 real operations in total.

TABLE 2

| Process | Number of real operations |
| --- | --- |
| Form u(n) | $14M + 2Q + 2(M - 1)$ |
| $\pi(n) = u^H(n)P(n - 1)$ | $8M^2$ |
| $\tilde{k}(n) = \lambda + \pi(n)u(n)$ | $8M + 1$ |
| $k(n) = \dfrac{P(n - 1)u(n)}{\tilde{k}(n)}$ | $8M^2 + 2M + 6$ |
| $P(n) = (1/\lambda)(P(n - 1) - k(n)\pi(n))$ | $8M^2$ |
| Total | $24M^2 + 26M + 2Q + 5$ |

As shown in Table 2, after forming the vector u(n), its complex conjugate transpose $u^H(n)$ premultiplies P(n−1), u(n) itself postmultiplies the product $\pi(n)$ so formed and the result is summed with $\lambda$: $\lambda$ is a "forget factor" of known kind, and is usually in the range 0.95 to 1. If less than 1, it has the effect of progressively diminishing the effect of older data so that the calculation in Table 2 is weighted in favour of more recent data. Here $\lambda$ is set to 1, which weights all data equally. The sum $\tilde{k}(n) = \lambda + \pi(n)u(n)$ is used to divide a product of P(n−1) postmultiplied by u(n): the result of this division is subtracted from P(n−1), and the difference so obtained is multiplied by $1/\lambda$ to give the recursively updated inverse correlation matrix P(n).

Adaptive Doppler rate compensation for an array in accordance with the invention will now be described. In addition to a fixed Doppler shift $f_d$, the received signal may also exhibit a rate-of-change of Doppler shift, i.e. Doppler rate. If the Doppler rate is linear with time t, it can be represented by $\alpha t$, where $\alpha$ is a constant, the Doppler rate in Hz/s. The received signal's time-varying received frequency component f can then be represented by:

$$f = f_c + f_d + \alpha t \qquad (11)$$

where $f_c$=carrier frequency.

The second and third terms on the right of Equation (11) constitute a baseband Doppler contribution at a varying frequency $f_b(t)$ given by:

$$f_b(t) = f_d + \alpha t \qquad (12)$$

The baseband Doppler contribution has a varying phase $\phi(t)$ given by integrating the right hand side of Equation (12) with respect to time and converting frequency f to angular frequency $\omega$, i.e.

$$\phi_b(t) = \omega_d t + 0.5 \dot{\omega}_d t^2 \qquad (13)$$

where $\dot{\omega}_d = 2\pi\alpha$ and $\omega_d = 2\pi f_d$ \qquad (14)

There will then be a received passband signal component $r_m(t)$ at the mth antenna element given by:

$$r_m(t) = s(t-\tau_m) e^{-j(2\pi f_c t + \phi b(t))} e^{-j2\pi f \tau_m(t)} \qquad (15)$$

Here, s(t) is the value of the wanted communications signal at time t. In the case of narrowband beamforming, the inter-antenna element propagation delay is significantly less than a receive signal bandwidth reciprocal: this enables the inter-antenna element propagation delay to be represented by a phase shift alone, i.e. $s(t-\tau_m) \equiv s(t)$. Equation (15) has a spatial term $e^{-j2\pi f \tau_m(t)}$ (controlled by. $\tau_m(t)$), and this term is essentially static over the duration of the training sequence. That is, in Equation (12), $f_b(t)$ is very small compared to $f_c$ in Equation (11). For a uniformly-spaced, linear array, the signal phase spatial component for the mth antenna element $e^{-j2\pi f \tau_m(t)} = e^{-j2\pi f(d/c)(m-1)\sin\theta(t)}$, where d is the inter-antenna element spacing, c is the velocity of light and $\theta(t)$ is the possibly (but not necessarily) time-varying angle of arrival of a signal to be detected at the receiver. An antenna element at an edge of the M-antenna array is taken to be a phase reference for all antenna elements (i.e. $0 \leq m \leq M-1$).

Hence, for example, for a uniformly-spaced, linear antenna array with antenna element spacing $d = \beta\lambda = (\beta c/f_c)$, then the term $e^{-j2\pi f \tau_m(t)}$ in Equation (15) is given by:

$$e^{-j2\pi f \tau_m(t)} = e^{-j2\pi(f_c + f_b(t))(\beta/f_c)(m-1)\sin\theta(t)} \approx e^{-j2\pi\beta(m-1)\sin\theta(t)} \qquad (16)$$

The approximation of the right of Equation (16) holds good if $f_b(t)$ is very small compared to $f_c$, which will usually be satisfied in practice. In which case, it is only necessary to consider how to compensate for the time-varying Doppler term, $f_b(t)$, in time and not space, i.e. via the adaptive basis function method described with reference to Equation (3).

Given the foregoing assumptions, the relationship between the maximum Doppler rate that can be tolerated and the maximum frequency span of the sinusoidal basis functions is $[((\alpha K/f_s) + f_d)] \leq f_{max}$, where $f_d$ is the Doppler offset, $f_s$ is the sample rate, K is the number of samples in a processing window defined by the length of the training sequence. That is, the invention can cope with a degree of Doppler offset inherently, provided that the sum of the Doppler offset and the change in Doppler offset over the duration of the training sequence does not lead to a frequency that lies outside the maximum frequency span of the set of basis functions. Alternatively, if the maximum Doppler offset and maximum Doppler rate are known a priori, then an appropriate basis can be constructed as described above, for example, from a data matrix A of complex sinusoids and its SVD (or other methods as mentioned earlier).

To illustrate the versatility of the invention, an embodiment previously described was simulated once more: i.e. the received signal was an HF standard NATO Agreement 4285 signal with signal-to-noise-ratio 3 dB, incident at 30° on an antenna array with six antenna elements arranged with centres in a straight line spaced by half-wavelength intervals. The situation which was envisaged was a fixed Doppler offset of 32 Hz and a Doppler rate varying from −100 Hz/s to +100 Hz/s and ten successive training periods. An initial 80 symbols of a 256 symbol data frame were used as a training sequence. A total time period examined was 6211 samples (at a sample rate of 6.25 kHz, training sequence of 208 samples). From calculations previously described the most negative Doppler is:

$$[\{(-100 \times 6211)/6250\} + 32] = -67.4 \text{ Hz}.$$

The frequency span which the basis functions were designed to cover in the earlier embodiment was −75 Hz to +75 Hz, so it will accommodate the above most negative value of Doppler offset. On the other hand, over this time period the signal frequency will exceed the span of the basis when the Doppler rate is (6250 (75-32))/6211=43.3 Hz/s.

As before, a detection statistic provides a measure of performance with a threshold of 0.4. FIG. 8 shows two curves 60 and 62 of detection statistics for different MC-LSQ methods plotted against Doppler change in frequency over a training period. Curve 60 was calculated for a case where a theoretical ideal Doppler compensation had been implemented from knowledge of offset and rate, and curve 62 is for Doppler compensation using the MC-LSQ method of the invention incorporating adaptive basis function combining. The error bars indicate a standard deviation of the detection statistic. averaged over detections in the ten successive training periods. The abscissa is quantified in terms of values of the Doppler change over the duration of a single training sequence; the total change will be 10 times these values. Curve 60 is the best detection performance that can be achieved. The invention's performance shown in curve 62 substantially matches the curve 60 ideal until the Doppler change over the duration of the training sequence is approximately 1.45 Hz; this equates to a Doppler rate of (6250×1.45)/208=43.6 Hz (i.e. as calculated above). Error bars increase in length to the right in this drawing reflecting movement of the Doppler component outside the frequency range spanned by the basis functions, and so the detection statistic decreases. It should be mentioned that for HF STANAG 4285 the Doppler rate is 3 Hz/s. The range of Doppler rate was exaggerated in the current example in order to illustrate the performance of the invention.

The example described with reference to FIG. 8 was also used to assess Doppler offset estimation performance. It was assumed that there was an initial Doppler offset of 32 Hz and a Doppler rate of 39 Hz/s. FIG. 9 shows a true average Doppler offset over a training sequence period as a solid line, and a dotted line with circles show this offset estimated in accordance with the invention; these two plots are virtually coincident. FIG. 10 shows a true Doppler rate as a solid line, and a dotted line with circles shows Doppler rate estimated in accordance with the invention. The Doppler rate was estimated by taking the difference between two successive frequency estimates and dividing by the time interval between theses two frequency estimates (i.e. a frame period). The Doppler rate estimate is reasonable agreement with the true equivalent. Filtering and/or tracking of estimates is likely to improve matters.

The above adaptive Doppler offset compensation technique was designed to render initial detection/acquisition of a signal of interest relatively insensitive to Doppler effects: synthesis of a Doppler component suitable for the signal recovery stage was not originally required. Estimation of the Doppler rate is likely to prove more difficult than recovery of Doppler offset. For example, the prior art methods given in the four references below require that the signal used to estimate the Doppler rate is a true sinusoid.

Su Y. T. and Wu R. C "Frequency Acquisition and Tracking in High Dynamic Environments", IEEE Trans. Vehic. Technol., Vol. 49, No. 6, November 2000, pp2419-29.

Giannetti F., Luise M. and Reggiannini R. "Simple Carrier Frequency Rate-of-Change Estimators", IEEE Trans. Commun., Vol. 47, No. 9, September 1999, pp1310-14

Ghogo M. and Swami A., "Estimation of Frequency Offset and Doppler Rate in Fading Channels", Proc. ICPWC'99, 1999, pp105-09.

Morelli M., "Doppler-rate Estimation for Burst Digital Transmission", IEEE Trans Commun., Vol. 50, No 5, May 2002, pp707-10.

In practice, in the presence of Doppler rate and Doppler offset, an antenna array output signal is likely to be, at best, a noisy and somewhat distorted sinusoid. A least-squares fit to unwrapped phase $\phi(kT_s)$ of this output may yield reasonable estimates for Doppler offset but perhaps not for Doppler rate. Unwrapped phase is a term of art for absolute phase, i.e. not merely phase with a value in the range 0 to $2\pi$, but including also an appropriate integer multiple of $2\pi$. It is ideally given by:

$$\phi(kT_s)=\phi_0+\omega_d kT_s+0.5\dot{\omega}_d k^2 T_s^2 \qquad (17)$$

where $\phi_0$ is the phase of a signal at a reference antenna element at an edge of the antenna array, k is a sample time index, $T_s$ is a sample time interval between successive samples and other terms are as previously defined.

There are several approaches to compensation for Doppler rate over a data frame. One such is estimation of a sequence of values of Doppler shift from the training sequence of successive data frames and employing interpolation to obtain the required correction for the Doppler waveform (see FIG. 10). A Doppler rate constant $\alpha$ is given by:

$$\alpha=(f_{d_2}f_{d_1})/(NT_s) \qquad (18)$$

where $f_{d_1}$ and $f_{d_2}$ are Doppler offsets at times $t_0$ and $t_0+NT_s$ respectively, N is a positive integer and $T_s$ is a time interval between successive samples of antenna output signals. It has been found that estimation of Doppler offset is a relatively robust process provided that Doppler rate over an estimation window in not excessive. See Su Y. T. and Wu R. C., "Frequency Acquisition and Tracking in High Dynamic Environments", IEEE Trans. Vehic. Technol., Vol. 49, No. 6, November 2000, pp2419-29.

There is also a need for frequency compensation for a single-channel receiver, i.e. instead of an array of antenna elements and multiple associated signal channels, there is only a single antenna with a single output signal x(k) at a kth sample time. It is therefore not possible to form a weighted combination Xw of signals from different antenna elements as in Equation (3). The problem is, however, similar to the multi-channel case, i.e. to find a combination of basis functions that approximate a frequency-shifted signal to be acquired or received. Over K samples of the single output signal x(k), i.e. for k=0 to K−1, a K-element data vector x is produced having elements $x_0$ to $x_{K-1}$. A least-squares cost function, J, for a single channel receiver output is given by:

$$J=\|\alpha x - Gv\|^2+\lambda(\alpha^* x^H x \alpha-1) \qquad (19)$$

where $\alpha$ and $\lambda$ are constants, G is a matrix equal to a product CF, C is a (K,K) diagonal matrix with a training sequence (without frequency shift), c, on its diagonal; F is a (K,P) matrix with columns which are appropriately selected basis functions as described previously, v is a vector of weights which are adaptive to minimise J, and * indicates a complex conjugate. As before the $\lambda$ term gives a constraint on output power from a receiver acquisition stage to ensure that non-trivial solutions for $\alpha$ and v can be found. This constraint is merely a scaling of output signal power and so does not affect signal acquisition. It can be shown that v is a principal eigenvector of a matrix $(G^H G)^{-1} G^H x (x^H x)^{-1} x^H G$ and that $\alpha=(x^H x)^{-1} x^H Gv$. A detection statistic is now defined to provide a measure of degree of success of signal acquisition. There is a variety of possible detection statistics. In this example the chosen detection statistic is $\gamma_d$ given by $\gamma_d = (v^H G^H Gv)/(\alpha^* x^H x \alpha)$, which is effectively the ratio of the power in the training sequence (modified by weighted sinusoids) to the beamformer output power. It may alternatively be based on a correlation coefficient similar to that mentioned earlier. Another alternative for a detection statistic is $\gamma_d=\alpha^* x^H G(G^H G)^{-1} G^H x \alpha$, since this term must be maximised to minimise the mean-square error conditioned on fixed $\alpha$.

Equation (19) may be written as:

$$J=\|x-CFv\|^2 \qquad (20)$$

where Fv=g and $v=(F^H C^H CF)^{-1} F^H C^H x=Bx$, B being a matrix which can be precomputed and stored. In either case, irrespective of the Doppler compensation method adopted, the Doppler offset can be found as previously described for the multi-channel case: e.g. a correlation of the complex conjugate transpose $g^H$ of g with sinusoidal functions s(f) that span the frequency uncertainty region is performed to determine which frequency is a best match to the frequency offset between the signal and the receiver LO.

Adaptive Doppler rate compensation can also be implemented for a single-antenna receiver in a similar way to that for a multiple antenna receiver. Also, an initial detection or acquisition search may be modified to cover a range of time delays. A cost function J can be written as:

$$J = \|x - C_1 F v_1 - C_2 F v_2 - \ldots\|^2 \qquad (22)$$

$$= \left\| x - [C_1 F\ C_2 F\ \ldots\ ] \begin{bmatrix} v_1 \\ v_2 \\ \vdots \end{bmatrix} \right\|^2$$

$$= \|X - \hat{G}\hat{v}\|^2$$

where $\hat{v}=(\hat{G}^H \hat{G})^{-1} \hat{G}^H x=Bx$, B is a matrix which can be precomputed and stored, $\hat{G}$ is a matrix of matrices $C_1 F$ etc. and $\hat{v}$ is a vector of vectors $v_1$ etc. Here each matrix $C_n$ (n=1, 2, ...) is diagonal and has all or part of the training sequence along its main diagonal with a delay (or time-shift) of (n−1) samples, i.e. the nth matrix $C_n$ has n−1 zeroes on its diagonal.

Adaptive Doppler compensation for a single-channel direct sequence spread-spectrum (DS-SS) receiver may be achieved as follows. For illustrative purposes, consider the case of a symbol-periodic DS-SS system, i.e. where the length of the spreading code (defined earlier) in chips is $LT_c$, where L is the number of chips in the spreading code and $T_c$ is the time duration of a chip. For illustrative purposes it is assumed that there is no multipath and that synchronisation has been achieved. The receiver output amplitude for the nth symbol is $y_n = w^H x(n)$, where w is an (L,1) weight vector and x(n) is an (L,1) data vector. An expectation value $E<|y_n|^2>$ of receiver output power is then minimised subject to a constraint, i.e.

$$\min E<|y_n|^2> \text{subject to } Z^H w = g \qquad (23)$$

where w is a weight vector equal to $M^{-1} Z (Z^H M^{-1} Z)^{-1} g$, M is a covariance matrix defined by $M = E<x(n) x^H(n)>$, z is a matrix given by $Z = [CF_1 \; CF_2 \ldots]$, and C and $F_p$ (p=1, 2 ...) are as defined earlier. Calculation of the weight vector w requires an optimum value for the vector g. To estimate g, the power of the wanted signal in the receiver output is maximised subject to $\|g\|^2 = 1$. Upon substituting for the weight vector w output power $P_{out}$ is given by:

$$P_{out} \propto E<|y_n|^2> = g^H (Z^H M^{-1} Z)^{-1} g \qquad (24)$$

Hence, to maximise wanted signal power, g is a principal eigenvector of $(Z^H M^{-1} Z)^{-1}$.

In the case of the 3G mobile communications UMTS, adaptive Doppler compensation may be achieved for uplink signals (handset to base station) with a single-channel receiver as follows. UMTS has a training sequence of bits referred to as a pilot signal, of which each receiver has a replica referred to as a replica code. Received signal samples will be collected into a vector x and samples of the receiver's replica code collected into another vector c. For one pilot bit which incorporates L=256 chips each of duration $T_c$, it can be shown that a Doppler frequency uncertainty space ($\Delta f \leq |16.5$ kHz| as mentioned earlier) can be represented by two basis functions, i.e. by a two column matrix F (L,2). Hence an appropriate least-squares cost function J that incorporates adaptive frequency compensation is given by:

$$J = \|\text{imag}\{\text{diag}(c^* \cdot x)\} Fv - p\|^2 = \|\overline{X}v - p\|^2 \qquad (25)$$

where "imag" indicates that an imaginary part of a receiver sample correlation product is taken since the pilot signal is expected to reside on a quadrature or "Q" channel; "diag" indicates that the subsequent terms in parenthesis are diagonal elements of a diagonal matrix, "·" denotes "element-wise" multiplication, i.e. two vectors a and b are multiplied together element-wise to give a vector d if an ith element $d_i$ of d is equal to a product $a_i b_i$ of the ith elements of a and b respectively; $v = (\overline{X}^H \overline{X})^{-1} \overline{X}^H p$; and p is an (L,1) vector of pilot signal samples. The receiver output is given by $y = \text{imag}\{\text{diag}(c^* \cdot x)\} Fv$, which is summed and the estimated pilot bit is taken as the sign of the sum, i.e. $\text{sgn}(1^T y)$, where $1^T$ denotes an (L,1) vector of ones; and Fv is an (L,1) vector which can be used to find the Doppler shift as described earlier. In this method the samples of the correlation product are translated directly to baseband.

Results for adaptive compensation for Doppler shift using a receiver with a single antenna were obtained as follows. The acquisition of a single-channel binary phase shift keying (BPSK) signal of signal-to-noise ratio (SNR) 5 dB was simulated. This signal was filtered on transmit and receive with a root-raised cosine (RRC) filter of roll-off 0.2. There were 4 samples per symbol (RRC filter impulse response truncated to 10 symbols) and the SNR was set at the output of the receive filter.

Results are shown in FIGS. 11 and 12, which are plots of SNR on acquisition as a function of normalised Doppler offset ($\Delta f_d T$) on a logarithmic scale for training sequences of length 30 and 100 symbols respectively, each averaged over one hundred experimental runs. In these drawings, curves 80 and 90 show how SNR varies in the absence of any frequency compensation, i.e. the SNR falls away as normalised Doppler increases to $10^{-2}$. Curves 82 and 92 show how SNR varies if adaptive basis function frequency compensation in accordance with the invention is used: these curves demonstrate that a virtually constant and high SNR is maintained for the entire range of normalised Doppler, i.e. $10^{-5}$ to $10^{-1}$. For comparison purposes, results obtained using an alternative frequency compensation method are also shown as curves 84 and 94, this method being based on a Taylor expansion as described earlier. Although it is better than no frequency compensation at all, the Taylor expansion method is inferior to the invention at normalised Doppler above $10^{-2}$.

Table 3 shows sizes of basis sets of frequency functions used in frequency compensation in accordance with the invention to obtain the results shown in FIGS. 11 and 12. Here 1.0e-0n (n=1, 2, 3 4 or 5) means $10^{-n}$. Only in the case of normalised Dopplers $10^{-2}$ and $10^{-1}$ was more than one basis function required (i.e. when $|\sin c(\pi \Delta f_d LT)| > 0.1\pi$).

TABLE 3

Size of basis set as a function of normalised Doppler and training sequence length.

| Normalised Doppler | FIG. 11 30 training symbols | FIG. 12 100 training symbols |
|---|---|---|
| 1.0e−05 | 1 | 1 |
| 1.0e−04 | 1 | 1 |
| 1.0e−03 | 1 | 2 |
| 1.0e−02 | 2 | 4 |
| 1.0e−01 | 8 | 23 |

Table 4 shows estimated mean normalised Dopplers ("est") and true equivalents ("true"). It can be seen that these mean values are within 1% of true values in three out of four cases, and within 5% in the fourth case.

TABLE 4

True and estimated normalised Dopplers.

| Training symbols | Normalised Doppler | Normalised Doppler |
|---|---|---|
| 30: FIG. 11 | True: 0.01 est 0.009536 | True 0.1 est 0.09952 |
| 100: FIG. 12 | True 0.01 est 0.009928 | True 0.1 est 0.1 |

The method of the invention was incorporated in a software implementation of a single-channel HF STANAG 4285 modem and run with off-air data. A STANAG signal was employed which had a frame format (256 symbols) with a period of 106.67 ms and a channel symbol rate of 2.4 kilo-symbols/s. Acquisition was performed using a training sequence of 80 symbols that was a periodic repetition of a 31-chip m-sequence (31+31+18) as published in the Standardization Agreement, North Atlantic Treaty Organization, Military Agency for Standardization, "Characteristics of 1200/2400/3600 bits per second single tone modulators/demodulators for HF radio links", 1989. Hence, the correlation function has a main peak flanked by subsidiary peaks 31 symbols either side. The detection method used searched for two correlation peaks 31 symbols apart. However, to aid visualisation a correlation coefficient alone is shown in FIGS. 13 and 14 plotted against time for a short segment of off-air data. FIG. 13 shows the correlation coefficient for a received signal correlated with the training sequence for a zero Doppler offset. This data file had a Doppler offset of approximately 5 Hz (i.e. $\Delta f_d T = 2.1e$-03). FIG. 14 shows the correlation coefficient for a received signal when using the method of the invention (with seven basis functions to cover Doppler offsets up to a maximum $\Delta f_d$ of 75 Hz. As can be seen the invention operates satisfactorily, as the STANAG signal is detected.

FIG. 15 shows frequency offset estimates over a segment of off-air data plotted against time. A first curve 110 shows "true" frequency offset as tracked by a software modem implementation, i.e. after timing offset recovery, fine frequency compensation and filtering. A second curve 112 shows raw or initial frequency offset estimates on acquisition obtained by the method of the invention. As can be seen, these initial frequency estimates are in good agreement with the true frequency offset.

As described earlier for the multi-channel case, initial detection or acquisition search may be modified to cover a range of time delays as well as incorporating adaptive Doppler compensation.

As an illustration of adaptive single-channel frequency compensation, a simulation of the universal mobile telephone systems (UMTS) uplink, i.e. handset to base station, was implemented using the adaptive frequency compensation method of the invention. In this example, ten UMTS emitters were uniformly distributed in distance between 1 km and 5 km from a base-station and multipath and channel Doppler spread were ignored. The simulation employed power control as disclosed by Morelli M. in "Doppler-Rate Estimation for Burst Digital Transmission", IEEE Trans. Commun., Vol. 50, No. 5, May 2002, pp707-10. Transmissions were based on a 12.2 kilobits/s (kbps) voice service as disclosed in Agilent: "Designing and Testing 3GPP W-CDMA User Equipment, Application No 1356", http://literature.agilent.com/litweb/pdf/5980-1238E.pdf (a pseudo-quadrature amplitude modulated (pseudo-QAM) signal). As a measure of detection performance, estimation of known bits on a pilot channel was considered; here the data was on an in-phase (I) channel and the pilot on a quadrature (Q) channel (8 known pilot bits with bit rate 15 kbps) Processing was in accordance with Equation (24) et sequi.

One hundred experimental runs were made with emitter distribution as above and random Doppler offsets Af uniformly distributed in a frequency offset range $-6.5$ kHz$\leq \Delta f \leq 6.5$ kHz. FIGS. 16 and 17 indicate detection performance for a particular emitter over the pilot bit sequence with and without the adaptive frequency compensation method of the invention respectively. In these drawings a detection statistic is plotted against Doppler offset, and a detection statistic value of 1 indicates that the 8-bit pilot bit sequence was correctly detected and 0 indicates it was not. FIG. 16 shows that 100% of the values were 1, and therefore the adaptive frequency compensation method of the invention always detected the pilot bit sequence correctly. In contrast, FIG. 17 shows that 100% of the values were 0, indicating that without frequency compensation the pilot bit sequence was never detected.

FIGS. 18 and 19 show pilot bit counts from which the results shown in FIGS. 16 and 17 respectively were derived. FIG. 18 shows that all eight pilot bits were always detected using the adaptive frequency compensation method of the invention. FIG. 19 shows that, without frequency compensation, the number of pilot bits detected varied from one to seven but all eight pilot bits were never detected.

Although it is expected that UMTS base-stations will employ some form of frequency compensation, details do not appear in the open literature. Hence it is not possible to compare the performance of the adaptive frequency compensation method of the invention to techniques employed by UMTS base-stations.

The computations set out in the foregoing description can clearly be evaluated in an automated manner, i.e. by an appropriate computer program comprising program code instructions embodied in an appropriate carrier medium and running on a conventional computer system. The computer program may be embodied in a memory, a floppy or compact or optical disc or other hardware recordal medium, or an electrical or optical signal. Such a program is straightforward for a skilled programmer to implement on the basis of the foregoing description without requiring invention, because it involves well known computational procedures.

The invention claimed is:

1. A method of compensating for frequency offset in a received signal comprising:

constructing a reference signal comprising a training sequence of the received signal and one or more basis functions;

minimizing a cost function associated with the reference signal, wherein the cost function comprises the training sequence, the one or more basis functions, and the received signal; and acquiring a desired frequency-shifted signal when the cost function indicates a predetermined degree of correlation between the reference signal and the received signal.

2. The method according to claim 1 wherein a minimum cost function indicates a maximum degree of correlation between the reference signal and the received signal.

3. The method according to claim 1 wherein the cost function further comprises a constraint to obtain non-trivial solutions.

4. The method according to claim 3, wherein the constraint requires non-zero signal power.

5. The method according to claim 1, wherein the cost function is J given by:

J=$\|Xw-CFv\|^2+\lambda(w^H X^H Xw-1)$, wherein X is a matrix of received signal samples, wherein w is a vector of beamforming weights configured to minimize J, wherein C is a diagonal matrix having elements of the training sequence on its diagonal, wherein F is a matrix having columns defining respective basis functions, wherein v is a vector of weights configured to minimize J, wherein superscript index H indicates a complex conjugate transpose, and wherein $\lambda$ is a Lagrange multiplier for a term to constrain beamformer output power to be non-zero.

6. The method according to claim 5, further comprising:

determining the vectors w and v at intervals from estimates of a correlation matrix determined from multiple data vectors and from inverses of such estimates recursively updated to reflect successive new data vectors which are rows of the matrix X.

7. The method according to claim 6, wherein the inverse correlation matrices are recursively updated by:

forming a vector u(n) having a first element $u_1(n)$ equal to $\sqrt{U_{1,1}(n)}$ and other elements $u_p(n)$ (p=2 to M) which are respective ratios $U_{p,1}(n)/u_1(n)$, wherein $U_{p,1}(n)$ is a pth element of a first column of a matrix U(n), wherein the matrix U(n)=u(n)$u^H$(n)=x(n)$x^H$(n)−x(n−K+1)$x^H$(n−K+1), wherein x(n) is a most recent data vector, wherein x(n−K+1) is a least recent data vector involved in updating, and wherein x(n)$x^H$(n) and x(n−K+1)$x^H$(n−K+1) are correlation matrices;

premultiplying a previous inverse correlation matrix P(n−1) by vector $u^H$(n) and postmultiplied by the vector u(n) to form a product;

adding the product to a forget factor to form a sum;

postmultiplying the previous inverse correlation matrix P(n−1) by the vector u(n) to form a second product;

dividing the second product by the sum to form a quotient; and subtracting the quotient from the previous inverse correlation matrix P(n−1) to provide a difference.

8. The method according to claim 1, wherein the received signal is acquired by a single antenna element.

9. The method according to claim 8, wherein the cost function is J given by:

$J=\|x-CFv\|^2$, wherein x is a vector of received signal samples, wherein C is a diagonal matrix having elements of the training sequence on its diagonal, wherein F is a matrix having columns defining respective basis functions, and wherein v is a vector of weights configured to minimize J.

10. The method according to claim 8, wherein the cost function is J given by:

$J=\|\alpha x-Gv\|^2+\lambda(\alpha^* x^H x \alpha - 1)$, wherein $\alpha$ is a scaling factor, wherein x is a vector of received signal samples, wherein C is a diagonal matrix having elements of the training sequence on its diagonal, wherein F is a matrix having columns defining respective basis functions, wherein G is a matrix equal to CF, wherein v is a vector of weights configured to minimize J, wherein superscript index H indicates a complex conjugate transpose, and wherein $\lambda$ is a Lagrange multiplier for a term to constrain beamformer output power to be non-zero.

11. An apparatus configured to compensate for frequency offset in a received signal, wherein the apparatus comprises:

means for constructing a reference signal comprising one or more basis functions and a training sequence, wherein the means for constructing the reference signal is configured to minimize a cost function comprising the one or more basis functions, the training sequence, and the received signal; and means for acquiring a desired frequency-shifted signal when the cost function indicates a predetermined degree of correlation between the reference signal and the received signal.

12. The apparatus according to claim 11, wherein the means for acquiring comprises multiple antenna elements.

13. The apparatus according to claim 12, wherein the cost function further comprises a constraint to obtain a non-trivial solution, and wherein the constraint requires non-zero signal power.

14. The apparatus according to claim 11, wherein the cost function is J given by:

$J=\|Xw-CFV\|^2+\lambda(w^H X^H X w - 1)$, wherein X is a matrix of received signal samples, wherein w is a vector of beamforming weights configured to minimize J, wherein C is a diagonal matrix having elements of the training sequence on its diagonal, wherein F is a matrix having columns defining respective basis functions, wherein v is a vector of weights configured to minimize J, wherein superscript index H indicates a complex conjugate transpose, and wherein $\lambda$ is a Lagrange multiplier for a term to constrain beamformer output power to be non-zero.

15. The apparatus according to claim 14, further comprising:

means for determining the vectors w and v at intervals from estimates of a correlation matrix determined from multiple data vectors and from inverses of such estimates recursively updated to reflect successive new data vectors which are rows of the matrix X.

16. The apparatus according to claim 14, further comprising means for recursively updating inverse correlation matrices by:

forming a vector u(n) having a first element $u_1(n)$ equal to $\sqrt{U_{1,1}(n)}$ and other elements $u_p(n)$ (p=2 to M) which are respective ratios $U_{p,1}(n)/u_1(n)$, wherein $U_{p,1}(n)$ is a pth element of a first column of a matrix U(n), wherein the matrix $U(n)=u(n)u^H(n)=x(n)x^H(n)-x(n-K+1)x^H(n-K+1)$, wherein x(n) is a most recent data vector, wherein x(n−K+1) is a least recent data vector involved in updating, and wherein $x(n)x^H(n)$ and $x(n-K+1)x^H(n-K+1)$ are correlation matrices;

premultiplying a previous inverse correlation matrix P(n−1) by vector $u^H(n)$ and postmultiplied by the vector u(n) to form a product;

adding the product to a forget factor to form a sum;

postmultiplying the previous inverse correlation matrix P(n−1) by the vector u(n) to form a second product;

dividing the second product by the sum to form a quotient; and subtracting the quotient from the previous inverse correlation matrix P(n−1) to provide a difference.

17. The apparatus according to claim 11, wherein the means for acquiring comprises a single antenna element, and wherein the single antenna is configured to product a single output signal for any given sample time.

18. The apparatus according to claim 11, wherein the cost function is J given by:

$J=\|x-CFv\|^2$, wherein x is a vector of received signal samples, wherein C is a diagonal matrix having elements of the training sequence on its diagonal, wherein F is a matrix having columns defining respective basis functions, and wherein v is a vector of weights configured to minimize J.

19. The apparatus according to claim 11, wherein the cost function is J given by:

$J=\|\alpha x-GV\|^2+\lambda(\alpha^* x^H x \alpha - 1)$, wherein $\alpha$ is a scaling factor, wherein x is a vector of received signal samples, wherein C is a diagonal matrix having elements of the training sequence on its diagonal, wherein F is a matrix having columns defining respective basis functions, wherein G is a matrix equal to CF, wherein v is a vector of weights configured to minimize J, wherein superscript index H indicates a complex conjugate transpose, and wherein $\lambda$ is a Lagrange multiplier for a term to constrain beamformer output power to be non-zero.

20. A computer-readable medium having stored thereon computer-executable instructions that, in response to execution by a system, cause the system to perform operations comprising:

constructing a reference signal comprising an original training sequence and a plurality of sinusoidal basis functions;

minimizing a cost function associated with the reference signal, wherein the cost function comprises the original training sequence, the plurality of sinusoidal basis functions, and a received signal; and acquiring a desired frequency-shifted signal when the cost function indicates a predetermined degree of correlation between the reference signal and the received signal.

21. The computer-readable medium according to claim 20, wherein the operations further comprise:

constructing a comparison training sequence that is an adaptively formed combination of the plurality of sinusoidal basis functions and the original training sequence.

22. The computer-readable medium according to claim 20, wherein the cost function further comprises constraint to obtain non-trivial solutions, and wherein the constraint requires non-zero signal power.

23. The computer-readable medium according to claim 20, wherein the cost function is J given by:

$J=\|Xw-CFv\|^2+\lambda(w^H X^H Xw-1)$, wherein X is a matrix of received signal samples, wherein w is a vector of beamforming weights configured to minimize J, wherein C is a diagonal matrix having elements of the training sequence on its diagonal, wherein F is a matrix having columns defining respective basis functions, wherein v is a vector of weights configured to minimize J, wherein superscript index H indicates a complex conjugate transpose, and wherein $\lambda$ is a Lagrange multiplier for a term to constrain beamformer output power to be non-zero.

24. The computer-readable medium according to claim 23, wherein the operations further comprise:

determining the vectors w and v at intervals from estimates of a correlation matrix determined from multiple data vectors and from inverses of such estimates recursively updated to reflect successive new data vectors which are rows of the matrix X.

25. The computer-readable medium according to claim 23, wherein the operations further comprise recursively updating inverse correlation matrices by:

forming a vector u(n) having a first element $u_1(n)$ equal to $\sqrt{U_{1,1}(n)}$ and other elements $u_p(n)$ (p=2 to M) which are respective ratios $U_{p,1}(n)/u_1(n)$, wherein $U_{p,1}(n)$ is a pth element of a first column of a matrix U(n), wherein the matrix $U(n)=u(n)u^H(n)=x(n)x^H(n)-x(n-K+1)x^H(n-K+1)$, wherein x(n) is a most recent data vector, wherein x(n−K+1) is a least recent data vector involved in updating, and wherein $x(n)x^H(n)$ and $x(n-K+1)x^H(n-K+1)$ are correlation matrices;

premultiplying a previous inverse correlation matrix P(n−1) by vector $u^H(n)$ and postmultiplied by the vector u(n) to form a product;

adding the product to a forget factor to form a sum;

postmultiplying the previous inverse correlation matrix P(n−1) by the vector u(n) to form a second product;

dividing the second product by the sum to form a quotient; and subtracting the quotient from the previous inverse correlation matrix P(n−1) to provide a difference.

26. The computer-readable medium according to claim 20, wherein the received signal is acquired by a receiver comprising a single antenna element.

27. The computer-readable medium according to claim 26, wherein the cost function is J given by:

$J=\|x-CFv\|^2$, wherein x is a vector of received signal samples, wherein C is a diagonal matrix having elements of the original training sequence on its diagonal, wherein F is a matrix having columns defining respective basis functions, and wherein v is a vector of weights configured to minimize J.

28. The computer-readable medium according to claim 26, wherein the cost function is J given by:

$J=\|\alpha x-Gv\|^2+\lambda(\alpha^* x^H x\alpha-1)$, wherein $\alpha$ is a scaling factor, wherein x is a vector of received signal samples, wherein C is a diagonal matrix having elements of the original training sequence on its diagonal, wherein F is a matrix having columns defining respective basis functions, wherein G is a matrix equal to CF, wherein v is a vector of weights configured to minimize J, wherein superscript index H indicates a complex conjugate transpose, and wherein $\lambda$ is a Lagrange multiplier for a term to constrain beamformer output power to be non-zero.

29. The method according to claim 1, wherein the one or more basis functions comprise a sinusoid.

30. The apparatus according to claim 11, wherein the one or more basis functions span a subspace in which a complex sinusoid associated with the frequency offset lies.

\* \* \* \* \*

UNITED STATES PATENT AND TRADEMARK OFFICE
CERTIFICATE OF CORRECTION

PATENT NO.       : 7,715,499 B2                                                                Page 1 of 1
APPLICATION NO.  : 10/589530
DATED            : May 11, 2009
INVENTOR(S)      : Warner It is certified that error appears in the above-identified patent and that said Letters Patent is hereby corrected as shown below:

At column 20, line 16, please replace "signal comprising" with --signal, comprising--.
At column 20, line 27, please replace "claim 1" with --claim 1,--.
At column 20, line 30, please replace "claim 1" with --claim 1,--.
At column 21, line 33, please replace "means for constructing a reference signal comprising one or more basis functions and a training sequence, wherein the means for constructing the reference signal is configured to minimize a cost function comprising the one or more basis functions, the training sequence, and the received signal; and means for acquiring a desired frequency-shifted signal when the cost function indicates a predetermined degree of correlation between the reference signal and the received signal." with --means for constructing a reference signal comprising one or more basis functions and a training sequence, wherein the means for constructing the reference signal is configured to minimize a cost function comprising the one or more basis functions, the training sequence, and the received signal; and¶means for acquiring a desired frequency-shifted signal when the cost function indicates a predetermined degree of correlation between the reference signal and the received signal.--.
At column 21, line 51, please replace "Xw-CFV" with --Xw-CFv--.
At column 22, line 38, please replace "GV" with --Gv--.
At column 23, line 2, please replace "comprises constraint" with --comprises a restraint--.

Signed and Sealed this

Thirtieth Day of November, 2010

David J. Kappos
*Director of the United States Patent and Trademark Office*